US008626987B2

(12) United States Patent  
Jung et al.

(10) Patent No.: US 8,626,987 B2
(45) Date of Patent: Jan. 7, 2014

(54) FLASH MEMORY SYSTEM AND DEFRAGMENTATION METHOD

(75) Inventors: Dawoon Jung, Hwaseong-si (KR); Moon Sang Kwon, Seoul (KR); Dong Jun Shin, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 287 days.

(21) Appl. No.: 12/912,997

(22) Filed: Oct. 27, 2010

(65) Prior Publication Data

US 2011/0099326 A1  Apr. 28, 2011

Related U.S. Application Data

(60) Provisional application No. 61/255,119, filed on Oct. 27, 2009.

(30) Foreign Application Priority Data

May 4, 2010  (KR) .......................... 10-2010-0042077

(51) Int. Cl.
*G06F 13/00* (2006.01)
(52) U.S. Cl.
USPC .................... 711/103; 711/E12.002; 707/693
(58) Field of Classification Search
USPC ........................ 711/103, E12.002; 707/693
See application file for complete search history.

(56) References Cited

U.S. PATENT DOCUMENTS

| 6,038,636 | A * | 3/2000 | Brown et al. ................. 711/103 |
| 6,205,529 | B1 * | 3/2001 | Shagam ......................... 711/170 |
| 6,397,311 | B1 * | 5/2002 | Capps ............................ 711/165 |
| 7,212,440 | B2 | 5/2007 | Gorobets | |
| 7,401,174 | B2 | 7/2008 | So et al. | |
| 7,725,506 | B1 * | 5/2010 | Stringham .................... 707/822 |
| 2004/0153762 | A1 | 8/2004 | Flynn et al. | |
| 2006/0015683 | A1 | 1/2006 | Ashmore et al. | |
| 2008/0010395 | A1 * | 1/2008 | Mylly et al. .................. 711/100 |
| 2008/0155175 | A1 | 6/2008 | Sinclair et al. | |
| 2008/0201518 | A1 | 8/2008 | Kim et al. | |
| 2008/0279005 | A1 | 11/2008 | France | |
| 2008/0282024 | A1 | 11/2008 | Biswas et al. | |
| 2009/0094433 | A1 * | 4/2009 | Thomas et al. ............... 711/172 |
| 2010/0146333 | A1 | 6/2010 | Yong et al. | |
| 2010/0185806 | A1 * | 7/2010 | Pruthi et al. .................. 711/103 |
| 2010/0262799 | A1 | 10/2010 | Lasser et al. | |

FOREIGN PATENT DOCUMENTS

| JP | 08129509 A | 5/1996 |
| JP | 2005202942 A | 7/2005 |
| JP | 2007018499 A | 1/2007 |
| JP | 2007066326 A | 3/2007 |
| JP | 4059002 B2 | 3/2008 |
| JP | 2008158773 A | 7/2008 |
| JP | 2008159013 A | 7/2008 |
| JP | 2008527586 A | 7/2008 |
| KR | 1020070102507 A | 10/2007 |
| KR | 1020080056491 A | 6/2008 |
| KR | 1020080075706 A | 8/2008 |
| KR | 1020090101673 A | 9/2009 |
| KR | 1020090108695 A | 10/2009 |
| WO | 9844420 A1 | 10/1998 |

* cited by examiner

*Primary Examiner* — Edward Dudek, Jr.
(74) *Attorney, Agent, or Firm* — Volentine & Whitt, PLLC

(57) ABSTRACT

Provided is a flash memory system supporting flash defragmentation. The flash memory system includes a host and a flash storage device. In response to a flash defragmentation command by the host, the flash storage device performs flash defragmentation by grouping fragments stored in fragmented blocks of a flash memory on a flash memory management unit basis. The flash memory management unit may be a memory block or page. The flash storage device performs the flash defragmentation regardless of the arrangement order of fragmented files stored in the flash memory.

15 Claims, 21 Drawing Sheets

Fig. 9

| Defrag Size | 0~127 |
|---|---|

| Start Sector | # of sectors |
|---|---|
| 0 | 16 |
| 24 | 16 |
| 56 | 32 |

Fig. 15

Original Block Mapping Table

| LBN | PBN |
|---|---|
| 0003 | |
| 0002 | 1214 |
| 0001 | 1213 |
| 0000 | 1212 |

New Block Mapping Table

| LBN | PBN |
|---|---|
| 0003 | 1211 |
| 0002 | |
| 0001 | |
| 0000 | 1212 |

FLASH MEMORY SYSTEM AND DEFRAGMENTATION METHOD

CROSS-REFERENCE TO RELATED APPLICATIONS

This U.S. non-provisional patent application claims priority under 35 U.S.C. §119 to Korean Patent Application No. 10-2010-0042077 filed on May 4, 2010, and to U.S. Provisional Application No. 61/255,119 filed on Oct. 27, 2009, the collective the subject matter of which is hereby incorporated by reference.

BACKGROUND

The present inventive concept relates to memory systems, and more particularly to flash memory systems supporting flash memory defragmentation operations. The inventive concept also relates to methods of defragmenting flash memory.

Unlike memory systems incorporating a hard disk, a flash memory system does not support a direct data overwrite operation. Instead, flash memory systems must perform an erase operation and then perform a write operation to effectively implement a rewrite or overwrite operation for data stored in the constituent flash memory. As is conventionally understood, flash memory performs erase operations on a memory block basis, and such operations typically require a lengthy period of execution time. These characteristics of flash memory make it difficult to directly apply a conventional hard disk file system to a flash memory system. That is, file systems and related data management approaches applied to memory systems incorporating a hard disk can not be applied to flash memory systems without significant adaptation. One common approach to the adaptation of legacy hard disk files systems to emerging flash memory systems (e.g., solid state drives or SSDs) requires the use of a so-called flash translation layer (FTL). The FTL is middleware that essentially translates the commands and operations defined within a hard disk file system into commands and operations compatible with a flash memory system. Thus, from the point of view of a host device generating and receiving data from the memory system, the FTL enables data to be read from and written to the flash memory system as if it were a conventional hard disk system.

Available memory space is valuable commodity within electronic systems and devices. The continuous random use of any memory space leads to some degree of memory space fragmentation. That is, the processes of writing data (or data files) to memory, deleting data from memory, and overwriting stored data results in fragmentation of available memory space. Too much fragmentation of memory space can slow the overall operation of the host device.

Hence, memory defragmentation (or defrag) is an operation that reduces the degree of fragmentation within a memory, or within a file system controlling the allocation of space within a memory. Defrag operations are conventionally applied to the hard disk of memory systems. Defrag improves operating speed of a memory system by reorganizing, concatenating and/or compacting fragmented data (or fragmented data files) within memory. Periodic defragmentation helps maintain the optimal performance of memory systems and constituent data storage media by reducing the file system overhead and data search time caused by excessive fragmentation.

SUMMARY

Embodiments of the inventive concept provide flash memory systems supporting flash defragmentation, and related methods of defragmentation.

Embodiments of the inventive concept provide an inventive defragmentation technique that is different from conventionally understood defragmentation techniques. Namely, embodiments of the inventive concept apply defragmentation to flash memory within a flash memory system to thereby reduce unnecessary data transfers by the flash memory system and improve overall performance.

In certain embodiments of the inventive concept, a system comprises; a host configured to control a flash defragmentation operation defragmenting a flash memory arranged in a plurality of blocks, and a data storage device comprising the flash memory and configured to perform the flash defragmentation operation by reading fragments from in a plurality of fragmented blocks among the plurality of blocks, and grouping the fragments on the basis of a defined flash memory management unit.

In certain embodiments of the inventive concept, a data storage unit comprises; a flash memory arranged in a plurality of blocks including a free block and a plurality of fragmented blocks storing a plurality of fragments, and a control unit configured to control a defragmentation operation defragmenting the flash memory and comprising a flash translation layer (FTL) configured to receive logical addresses and convert the logical addresses to corresponding physical addresses of the flash memory with reference to a mapping table, wherein during the defragmentation operation the control unit is further configured to read a subset of fragments among the plurality of fragments without regard to an arrangement order of the plurality of fragments as stored in the fragmented blocks, and write the subset of fragments in the free block.

In certain embodiments of the inventive concept, a method of defragmenting a flash memory operated under the control of a host, the flash memory being arranged in a plurality of blocks including a free block and a plurality of fragmented blocks respectively storing at least one fragment, the method comprises; identifying a plurality of fragments stored in the plurality of fragmented blocks according to corresponding logical addresses, converting the logical addresses to corresponding physical addresses using a flash translation layer (FTL), using the physical addresses, reading a subset of fragments in the plurality of fragments from at least one of the plurality of fragmented blocks, grouping the subset of fragments within a grouping memory having a size defined by a flash management unit, and writing the grouped subset of fragments from the grouping memory to the free block.

In certain embodiments of the inventive concept, a system comprises a host and a data storage device, the host comprises an application controlling execution of a defragmentation operation defragmenting a data storage device storing data used by the application. Operating within this system a method comprises; identifying a plurality of fragments stored in the memory, determining whether the data storage device is a hard disk drive (HDD), or a solid state drive (SSD) comprising a flash memory arranged in a plurality of blocks including a plurality of fragmented blocks and a free block, if the data storage device is a HDD, defining the defragmentation operation as a first type defragmentation operation compatible with storage of the data in the HDD, wherein the first type defragmentation operation is executed in accordance with logical addresses for the plurality of fragments defined by sector addresses of the HDD, and if the data storage device is a SSD, defining the defragmentation operation as a second type defragmentation operation compatible with storage of the data in the SSD, wherein the second type defragmentation operation is executed in accordance with the logical addresses of the plurality of fragments, wherein the second type defragmentation operation comprises; converting the logical addresses to corresponding physical addresses of the flash memory using a flash translation layer (FTL), using the physical addresses, reading a subset of fragments in the plurality of fragments from the plurality of fragmented blocks, grouping the subset of fragments into a grouping memory having a size defined by a flash management unit, and writing the grouped subset of fragments from the grouping memory to the free block.

In certain embodiments of the inventive concept, method of defragmenting a flash memory, the flash memory being arranged in a plurality of blocks including a free block and a plurality of fragmented blocks storing a plurality of fragments, and the method comprises; managing a mapping table correlating externally applied logical addresses with physical addresses for the flash memory using a flash translation layer (FTL), identifying the plurality of fragmented blocks and a plurality of fragments stored in the plurality of fragmented blocks, and reading a subset of fragments among the plurality of fragments without regard to an arrangement order of the plurality of fragments as stored in the fragmented blocks, and writing the subset of fragments in the free block.

In certain embodiments of the inventive concept a method of defragmenting a flash memory arranged in a plurality of blocks, each comprising a plurality of pages, the method comprises; identifying a plurality of fragmented blocks among the plurality of blocks, identifying a plurality of fragments stored in the fragmented blocks, identifying N free pages of one fragmented block, reading N fragments among the plurality of fragments from one of the plurality of fragmented blocks other than the one fragmented block without regard of an arrangement order of the N fragments as stored in the plurality of fragmented blocks, and writing the N fragments to fill the N free pages to thereby convert the one fragmented block to a new non-fragmented block.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 9 is a diagram illustrating a defragmentation size, a defragmentation start sector, and the number of sectors;

FIGS. 15 and 16 are diagrams illustrating the results of flash defragmentation of FIG. 14;

DETAILED DESCRIPTION OF THE EMBODIMENTS

Figure 1:
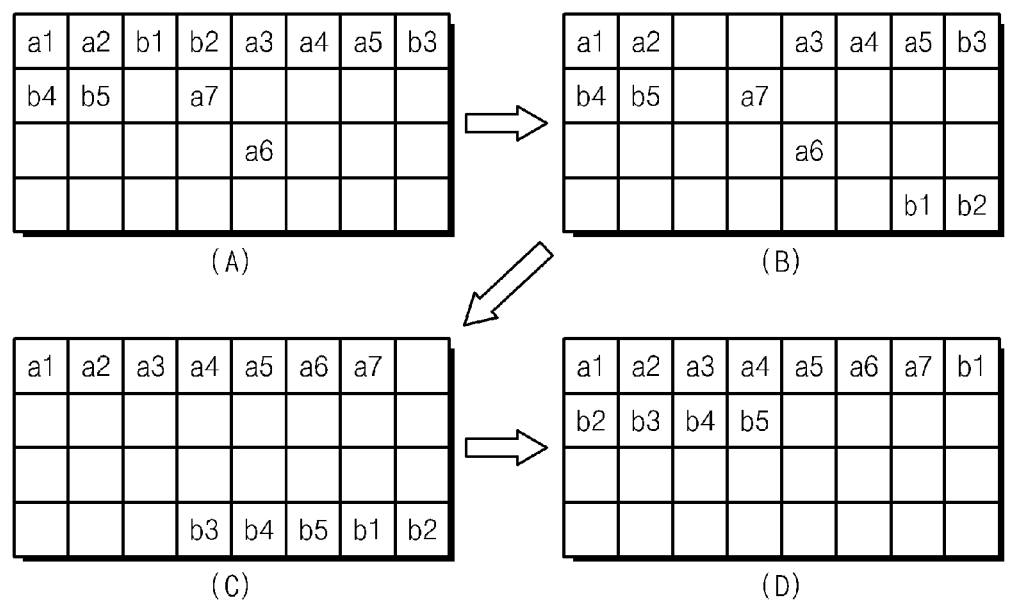
FIG. 1 is a conceptual diagram illustrating the effects of a defragmentation operation performed on a hard disk.

Certain embodiments of the inventive concept will now be described in some additional detail with reference to the accompanying drawings. The inventive concept may, however, be embodied in many different forms and should not be construed as being limited to only the illustrated embodiments. Rather, these embodiments are provided so that this disclosure will be thorough and complete, and will fully convey the scope of the inventive concept to those skilled in the art.

As noted above, defragmentation (or defrag) is an operation that reorganizes, concatenates, and/or compacts data otherwise inefficiently stored in memory. Data is typically stored in memory according to a defined memory space allocation scheme. The allocation scheme may use an allocation block of fixed or variable size to store data in memory. Since this allocation block is rarely the same size as data stored in the memory, a certain level of data fragmentation inherently arises as data is read from and written to memory.

For example, as one or more applications is run by a host (e.g., a processor or CPU) data related to the applications is read from and written to memory. Much of this data is associated with files defined by a file system (or file system manager) running on the host. Such files may be large or small and may be stored according to one or more allocation blocks in the memory. As this data (and corresponding data files) are manipulated, revised, updated, overwritten and deleted it becomes increasingly fragmented. That is, more and more data (or data file) fragments are created as the application(s) are run on the host.

In this context, the term "fragment" is used to denote a data file, or data file portion stored in memory that is related to, operationally associated with, or operationally defined by one or more applications or a file system running on a host. Respective fragments are usually stored in a discontiguous manner across multiple memory blocks, but this need not be the case in all circumstances. Those skilled in the art will recognize that the presence of relatively more fragments in a memory tends to generate relatively more memory space fragmentation. Thus, there is a direct relationship between the number of "fragments" stored in memory and resulting "fragmented memory space". Indeed, some conventional defragmentation operations use the term fragment to denote relatively small (and less useful) portions of available memory space.

The discontiguous (or scattered) storage of fragments in a memory slows the execution of the application(s) on the host, since the disparate fragments must be searched for across an expanding range of memory blocks in the memory system. Thus, execution of a defragmentation operation reduces search time by physically rearranging (re-storing) discontiguously stored fragments into more proximate memory space. Conventionally, by coherently grouping application-related (or file-related) fragments in a data storage device (e.g., a hard disk or semiconductor memory), search time within the memory system is reduced.

For example, it is assumed that the constituent fragments of two files, "a" and "b", are discontiguously stored on a hard disk as conceptually illustrated in FIG. 1A. The file "a" comprises fragments a1~a7, and file "b" comprises fragments b1~b5. As illustrated by the sequence shown in FIGS. 1A through 1D, multiple data copy operations are executed in relation to the hard disk to contiguously rearrange the physical location of the stored file fragments. Ultimately, the fragments making up files "a" and "b" are stored in a more search-efficient manner (i.e., a fully sequential arrangement) that maximizes the residual size of the available memory space (or "free space") on the hard disk, as illustrated in FIG. 1D, and minimizes the search time across all fragments making up each data file.

The foregoing example assumes a memory system incorporating a hard disk. Those skilled in the art will recognize the benefits of performing a defragmentation operation in relation to the unique electro-mechanical functionality associated with searching for fragments stored on a hard disk. Namely, as the surface area of the hard disk that must be traversed by a read/write head to find a fragment is reduced, the operating speed of the memory system will increase.

Unlike a hard disk based memory system, however, the operating speed of a memory system incorporating flash memory (hereinafter, generically referred to as a "flash storage device") is not materially affected by the stored order (or relative physical location) of fragments. That is, the discontiguous storing of fragments across a range of memory blocks defined within the flash memory does not in and of itself adversely slow read/write performance, since data search time in a flash memory does not vary as it does in a hard disk.

As a result, many of the conventional considerations motivating the use of defragmentation operations in a hard disk based memory system do not apply to flash memory based memory systems. Indeed, assuming that a flash storage device is substituted for the hard disk defragmented by the approach illustrated in FIG. 1, the numerous (and unnecessary) data transfers associated with the multiple copy operations would only shorten the useful life of the flash memory and degrade memory system performance. In sum, given the distinct performance and operating characteristics of flash memory over other types of bulk data storage devices (e.g., hard disks), a different approach motivated by a completely different rationale must be taken in relation to the defragmentation of a flash storage device.

Figure 2:
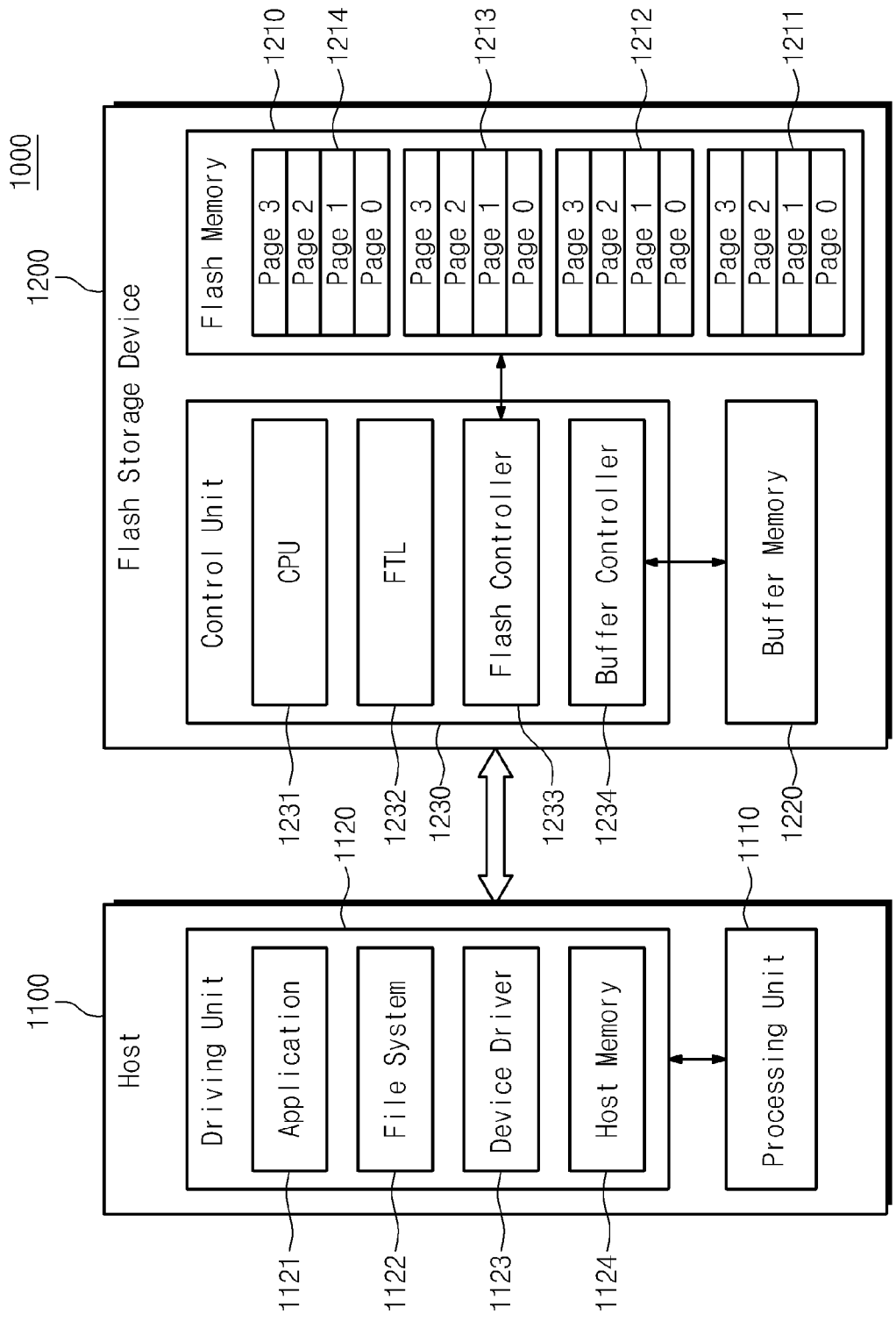
FIG. 2 is a block diagram of a flash memory system according to an exemplary embodiment of the inventive concept.

FIG. 2 is a block diagram of a flash memory system according to an embodiment of the inventive concept. Referring to FIG. 2, a flash memory system 1000 includes a host 1100 and a flash storage device 1200. The flash memory system 1000 supports flash memory management unit-based defragmentation (hereinafter referred to as "flash defragmentation").

Examples of a "flash memory management unit" include; (1) a memory block (or a super block) used as an erase operation unit, or (2) a page (or super page) used as a read/write operation unit.

The following description will focus on memory block-based flash defragmentation. That is, embodiments of the inventive concept perform flash defragmentation on a flash memory management unit basis, thereby making it possible to reduce the number of data transfer operations required during defragmentation and yet making efficient use of the free space remaining in flash memory. Referring to FIG. 2, the host 1100 generally includes a processing unit 1110 and a driving unit 1120. The processing unit (e.g., a CPU) 1110 controls the overall operation of the host 1100. The driving unit 1120 drives the flash storage device 1200 under the control of the processing unit 1110. The driving unit 1120 may include a host memory 1124 storing programming code (e.g., application and operating systems) and data (e.g., user defined data) that enables program execution and general functionality within the host 1100.

Referring to FIG. 2, the driving unit 1120 is illustrated as including an application 1121, a file system 1122, a device driver 1123, and a host memory 1124. The application 1121 is software executed on an operating system (OS) running on the host 1100. It is further assumed that at least one of the application 1121 or OS is programmed to support a flash defragmentation operation directed to flash storage device 1200.

In the illustrated embodiment, the file system 1122 is assumed to be software executing a file management protocol. In a more specific embodiment, the file system 1122 may be a file and data management system compatible with a legacy file system used to define and manage data and data files stored on a hard disk. In this particular context, the host 1100 and its constituent file system 1122 "see" the flash storage device 1200 as if it were a conventional hard disk storing data according to defined sector addresses.

Accordingly, the file system 1122 may manage data and data files on a sector basis for a hard disk and/or a block basis for a flash memory. Hereinafter, the file management unit of the file system 1122 will be referred to as a file system block. That is, the file system 1122 systemizes and manages the files on a file system block basis, whether the system block is compatible with hard disk sectors or flash memory blocks.

According to the illustrated embodiment of the inventive concept, for flash defragmentation, the file system 1122 "groups" file system blocks according to a flash memory management unit. This will be described later in some additional detail with reference to FIG. 8. The file system 1122 may set a flash defragmentation region on the basis of validity information of a file system block. The file system 1122 transfers file system block information to the flash storage device 1200 to request flash defragmentation. The file system block information may be converted on a sector basis (e.g., 512B) prior to transfer to the flash storage device 1200.

The file system 1122 may include flash memory file systems such as LFS, JFFS, YAFFS and LogFS, as well as FAT (File Application Table), NTFS (New Technology File System), HPFS (High Performance File System), UFS (Unix File System), Ext2 (Second Extended File System) and Ext3 (Third Extended File System) that are used mainly in floppy disks or hard disks.

The device driver 1123 is a program that enables the flash storage device 1200 to communicate with the host 1100. In order to use the flash storage device 1200, the device driver 1123 suitable for use with the flash storage device 1200 must be installed in the host 1100. The host memory 1124 may temporarily store "write data" to be written to, or "read data" having been read from the flash storage device 1200. Also, the host memory 1124 may be used as a working memory during execution of the application 1121, operation of the file system 1122, and/or the device driver 1123.

The flash storage device 1200 may perform flash defragmentation at in response to a corresponding command received from the host 1100. Alternately or additionally, the flash storage device 1200 may receive a sector address identifying flash defragmentation from the host 1100. Referring to FIG. 2, the flash storage device 1200 generally includes a flash memory 1210, a buffer memory 1220, and a control unit 1230.

The flash memory 1210 may perform an erase/write/read operations under the control of the control unit 1230. The flash memory 1210 shown in FIG. 2 includes a plurality of memory blocks. Each of the memory blocks includes a plurality of pages. Four memory blocks 1121~1124 each including four pages are specifically illustrated in FIG. 2 as a simple example. The flash memory 1210 performs erase operations on a memory block basis, but performs write/read operations on a page basis. It is further assumed in the working example that fragments are stored in the flash memory 1210 on a page-by-page basis. That is, one page is used as a data or data file allocation size by the host 1100.

The flash memory 1210 may be formed by a memory cell array of flash memory cells capable of storing 1-bit data per memory cell (i.e., single level memory cells) and/or at least 2-bit data per memory cell (i.e., multi-level memory cells).

The buffer memory 1220 may be used to temporarily store read data retrieved from and/or write data to be written to the flash memory 1210 by the host 1100. The buffer memory 1220 may also be used in conjunction with the operation of software or firmware, such as a flash translation layer (FTL). The buffer memory 1220 may be implemented using volatile memory devices such as DRAM and SRAM, or nonvolatile memory devices, such as EEPROM, MRAM and PRAM.

Referring to FIG. 2, the control unit 1230 illustrated in the example includes a central processing unit (CPU) 1231, a flash translation layer (FTL) 1232, a flash controller 1233, and a buffer controller 1234. The CPU 1231 analyzes/processes signals received from the host 1100, and controls the overall operation of the flash storage device 1200. The FTL 1232 translates logical addresses (e.g., a sector address) received from the host 1100 into a physical address compatible with the one or more memory devices in the flash memory 1210. The flash controller 1233 controls read/write/erase operations executed in relation to the flash memory 1210, and the buffer controller 1234 controls read/write operations executed in relation to the buffer memory 1220.

Figure 3:
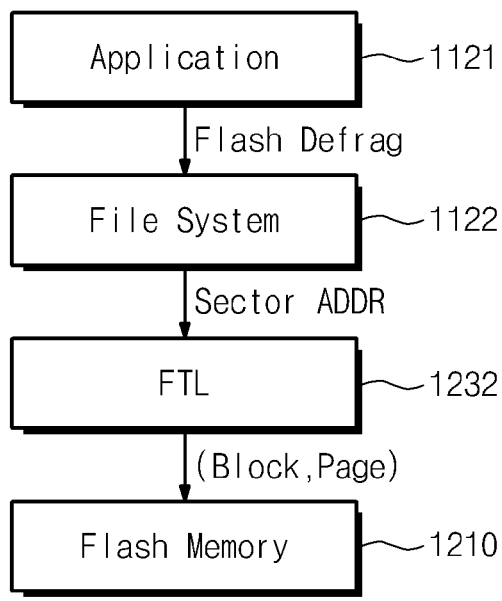
FIG. 3 is a block diagram illustrating a software layer structure of the flash memory system of FIG. 2.

FIG. 3 is a block diagram illustrating a hierarchical relationship between software/firmware components (or "software layer structure") of the flash memory system 1000 shown in FIG. 2. Referring to FIG. 3, the illustrated software layer structure for the flash memory system 1000 includes the application 1121, file system 1122, FTL 1232, and flash memory 1210. When receiving a flash defragmentation command (Flash Defrag) generated (e.g.) by the application 1121, the file system 1122 provides a flash defragmentation target sector address (Sector ADDR) to the FTL 1232. The FTL 1232 then translates the sector address into a physical address designating a block and/or page within the flash memory 1210.

Figure 4:
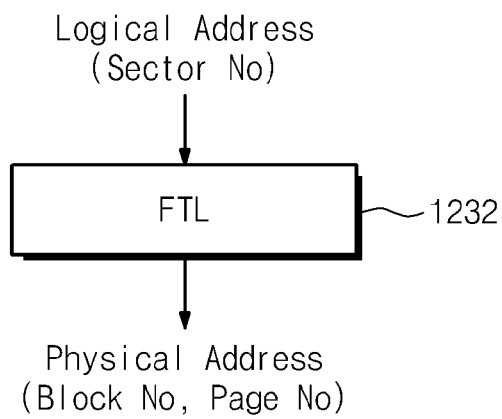
FIGS. 4 and 5 are diagrams illustrating a flash translation layer (FTL)

As illustrated in FIG. 4, the FTL 1232 translates a sector address—just one convenient example of a logical address—into a physical address—here, a block and page number associated with the memory cells of the flash memory 1210.

Figure 5:
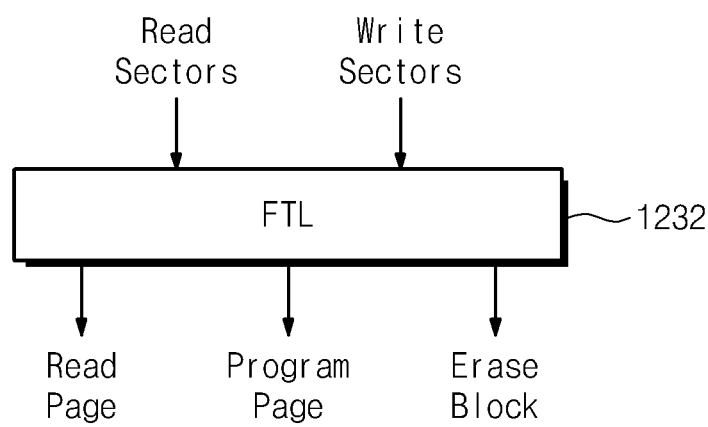

As further illustrated in FIG. 5, the FTL 1232 essentially performs an emulation operation mimicking read/write operations conventionally directed to a hard disk, but instead performing read/program/erase operation(s) in the flash memory 1210. Thus, from the viewpoint of higher level software/firmware components (e.g., the file system 1122 and the application 1121), the read/program/erase operations resulting from operation of the FLT 1232 are "seen as" conventional read/write operations directed to a hard disk.

The address translation functionality provided by the FTL 1232 may be performed using, for example, a virtual mapping table. Conventionally understood examples of mapping schemes that may be used include a page mapping scheme and/or a block mapping scheme. The page mapping scheme performs address translation on a page basis (e.g., 2 KB), and the block mapping scheme performs address translation on a block basis (e.g., 1 MB). Certain hybrid mapping schemes using both block and page mapping might also be used.

Figure 6:
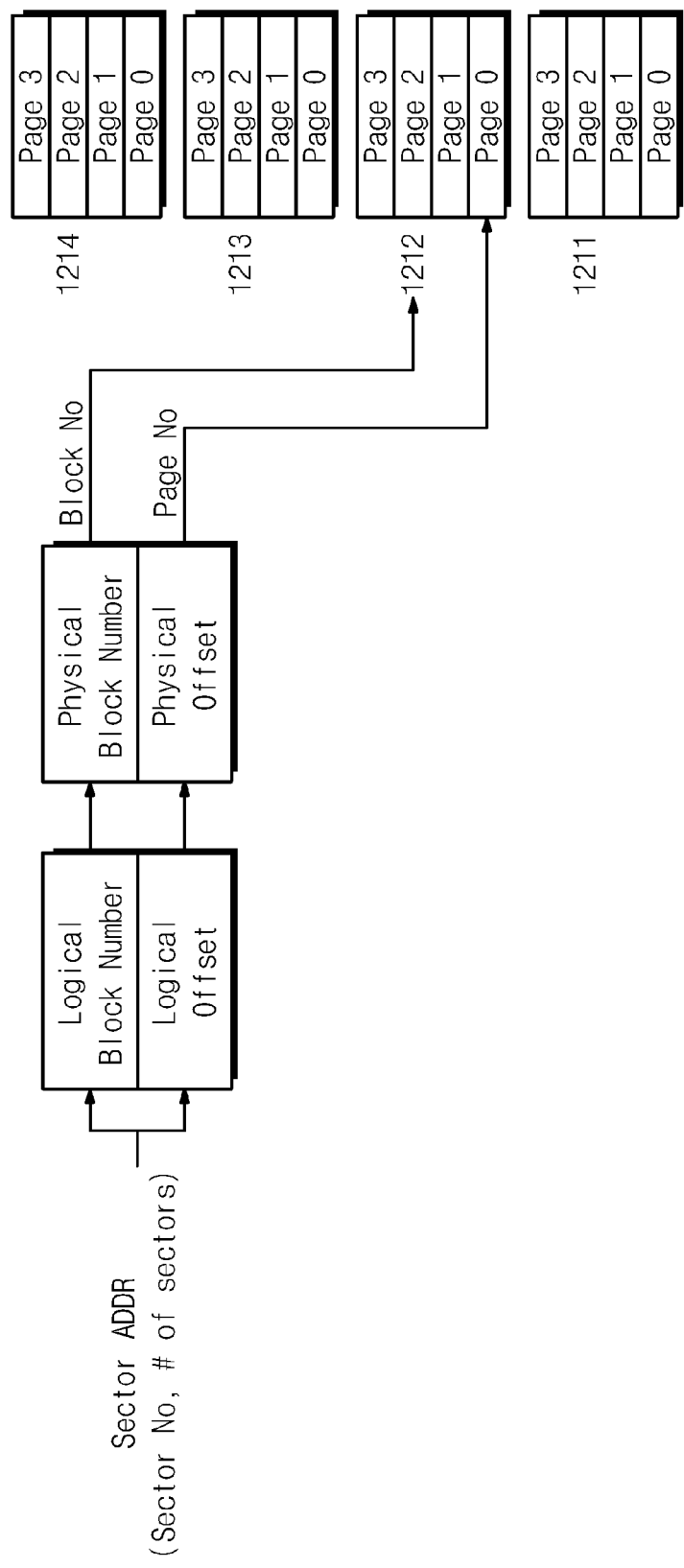
FIGS. 6 and 7 illustrate a block mapping method performed using a virtual mapping table.

FIG. 6 illustrates an exemplary address translation process based on an assumed block mapping scheme. Referring to FIG. 6, functionality provided by the FTL 1231 of FIG. 2 identifies a logical block number (LBN) and a logical offset in response to a sector address including, for example, a sector number and the number of sectors received from the file system 1122. The logical block number (LBN) and the logical offset are mapped respectively to a physical block number (PBN) and a physical offset that identify (e.g.,) block 1212 and page 0 within the flash memory 1210.

Those skilled in the art will recognize that the sector address generated by the file system 1122 is the outcome of a file system block definition. Using corresponding meta data, the file system 1122 may define one or more file system blocks in relation to a data cluster (e.g., 4K) conventionally defined in relation to a hard disk (e.g., 8 data sectors per cluster). Those skilled in the art will recognize that such cluster and file system block definitions are a matter of design choice and may be altered by assumptions regarding disk formatting. Regardless of such definitions, however, the resulting logical addresses will be converted to flash memory compatible logical addresses by the FTL 1232.

Figure 7:
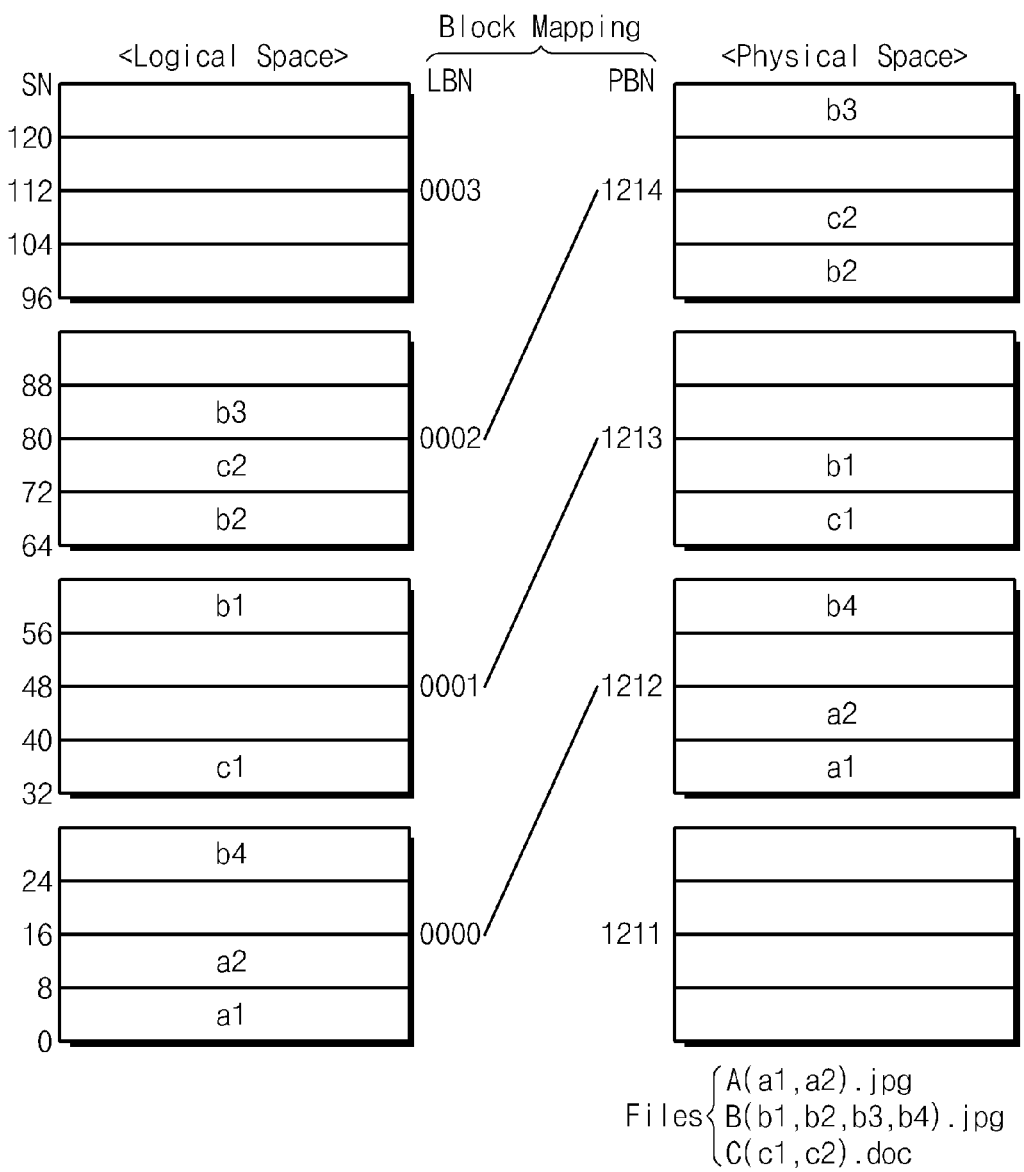

FIG. 7 further illustrates the block mapping approach assumed for the example of FIG. 6. Block mapping is performed between an actual physical space and a logical (or virtual) memory space within the flash memory 1210. Like the physical space, the logical space of the flash memory 1210 includes four blocks 0000~0003. Each of the blocks includes four pages, and each page is assumed to includes eight sectors. In FIG. 7, the reference "SN" denotes a sector number associated with the logical address space.

It is assumed that three files "A", a jpeg file including fragments a1 and a2, "B", another jpeg file including fragments b1 through b4, and "C", a Word file including fragments c1 and c2 are stored in the flash memory 1210. More specifically, fragments a1, a2 and b4 are stored in physical block 1212, fragments c1 and b1 are stored in physical block 1213, and fragments b2, c2 and b3 are stored in physical block 1214. In this initial discontiguous arrangement of fragments, physical block 1211 is a free block, empty of fragments. It is further assumed that logical block 0000 is mapped to physical block 1212, logical block 0001 is mapped to physical block 1213, and logical block 0002 is mapped to physical block 1214.

The FTL 1232 may use virtual logical space to cause the operation of the flash storage device 1200 to emulate hard disk compatible operations by performing random read/write operations. That is as seen from the host 1100, the flash memory 1210 appears to operates just like a hard disk in a defined virtual logical space, but actually operates according to performance characteristics unique to flash memory (e.g., the block-based erase, and the erase before write operation requirement) in physical space.

Since the FTL 1232 effectively allows the flash storage device 1200 to operate in emulation of a hard disk, the flash memory system 1000 may be seamlessly used in conjunction with legacy hard disk-based file systems, such as FAT, NTFS, Ext2 and Ext3—at least when viewed from higher level software/firmware components and the host 1100 in general.

Figure 8:
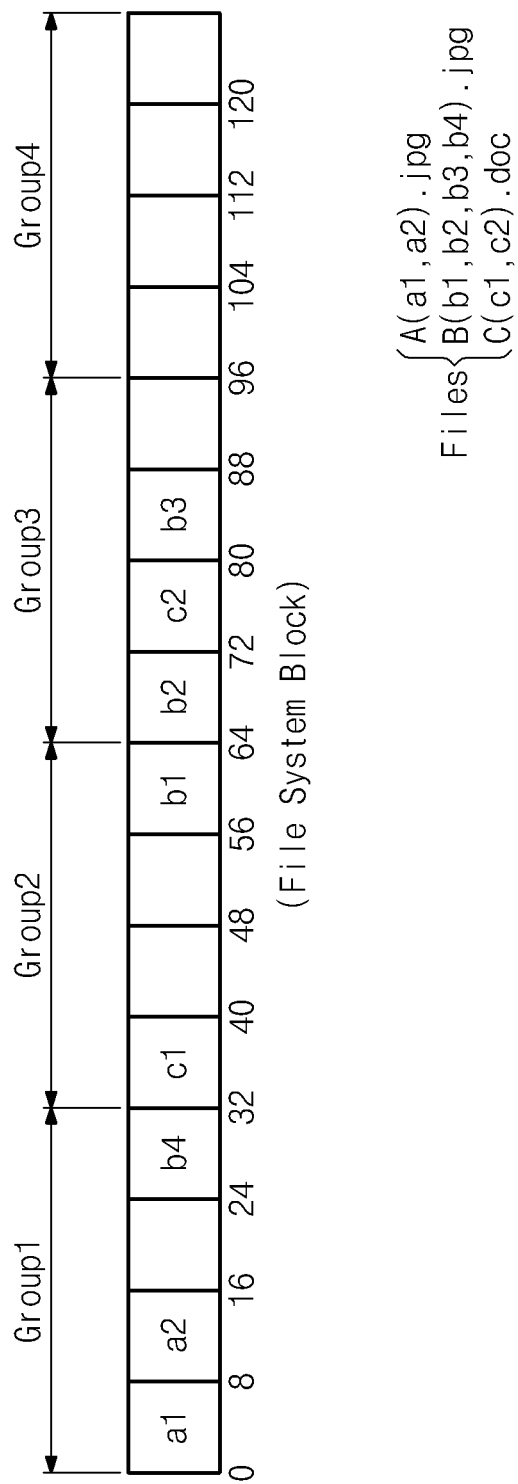
FIG. 8 illustrates a block structure of a file system of FIGS. 2 and 3.

FIG. 8 further illustrates the foregoing form the standpoint of a file system block structure acted upon by the file system 1122 of FIGS. 2 and 3. Referring to FIG. 8, fragments a1 and a2 of file A are stored in regions indicated by sector numbers 0~15. Fragment b4 of file B and fragment c1 of file C are stored in regions indicated by sector numbers 24~39. Fragments b1~b3 of file B and fragment c2 of file C are stored in regions indicated by sector numbers 56~97.

The file system 1122 may set (or define) a flash defragmentation region (e.g., sectors 0~127) according to a file system block. The file system 1122 thus provides a defragmentation size (e.g., sectors 0~127), a defragmentation start sector number, and the number of sectors to the flash storage device 1200 as illustrated in FIG. 9.

For flash defragmentation within the illustrated embodiment of the inventive concept, the file system 1122 rearranges (or "groups") file system blocks on a flash memory management unit basis (e.g., on a memory block basis). Referring to FIG. 8, the sectors 0~127 are divided into four groups Group1~Group4, wherein each group corresponds to a block within the flash memory 1210. However, other embodiments of the inventive concept may use a grouping approach that uses a page unit.

In order for each one of the defined groups of blocks to correspond to a block unit in the flash memory 1210, a start address for the file system block must be equal to a start address for the flash memory block, and a size of each group must be equal to an integer multiple of a size of the flash memory block. One technique for equalizing the start address of a file system block, and setting a group size is disclosed, for example, in published U.S. Patent Application No. 2008/0195833, the subject matter of which is hereby incorporated by reference.

As described above, the flash memory system 1000 consistent with an embodiment of the inventive concept performs flash defragmentation by grouping fragments stored in the flash memory 1210 according to a flash memory management unit. In this context, a "fragmented block" among the plurality of blocks forming the flash memory 1210 is a block storing at least one fragment, but also storing insufficient fragments to be substantially full. That is, a fragmented block is not a free block or a full block.

As will be explained hereafter in some additional detail, the flash memory system 1000 performs flash defragmentation regardless of the arrangement order of the fragments stored in memory. That is, at least one fragmented block is converted into a free block by rearranging ("groupings") fragments stored in fragmented blocks on a flash memory management unit basis, wherein the grouping process proceeds from fragment to fragment in a selected fragmented block, and then from a selected fragmented block to a next selected fragmented block regardless of either (1) a pre-existing file system defined arrangement order (e.g., a1 through a4 in FIG. 1), or (2) a stored physical arrangement order (e.g., a1 and a2 in FIG. 7) for the fragments stored in a fragmented block or across a plurality of fragmented blocks. This ability by embodiments of the inventive concept to perform flash defragmentation operations regardless of an arrangement order for the fragments being re-grouped is a clear departure from conventional defragmentation operations.

A flash defragmentation method for the flash memory system 1000 according to an embodiment of the inventive concept may include flash defragmentation by the host 1100 (section II below) and/or flash defragmentation by the flash storage device 1200 (section III below). Flash defragmentation by the host is most commonly performed in relation to data transfers between the host 1100 and the flash storage device 1200. Flash defragmentation by the flash storage device 1200 is most commonly performed without relation to a specific data transfer between the host 1100 and the flash storage device 1200.

Figure 10:
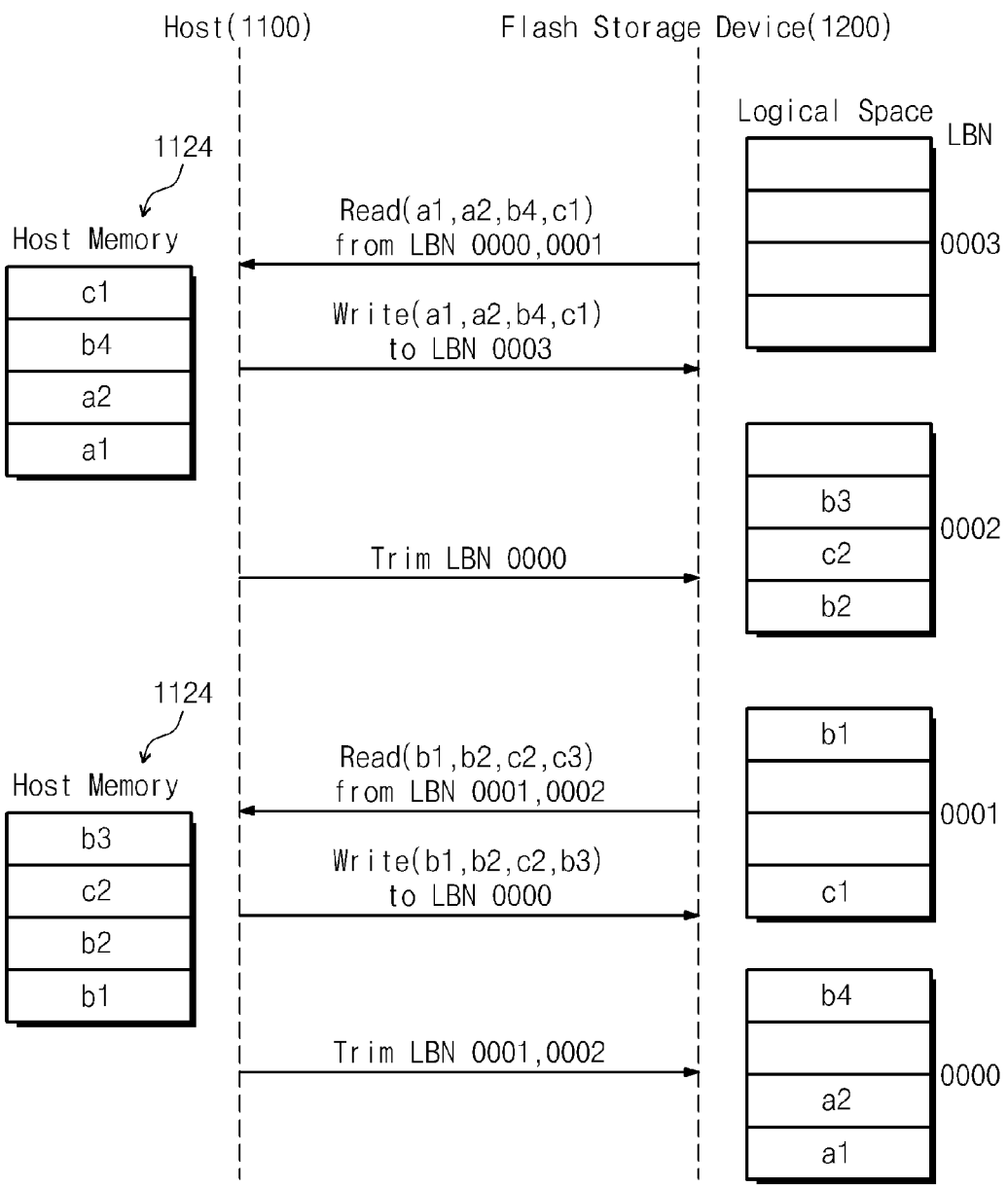
FIG. 10 is a diagram illustrating flash defragmentation by a host.

FIG. 10 is a diagram conceptually illustrating a flash defragmentation operation executed by the host 1100. In the illustrated example, the host 1100 performs flash defragmentation on a defined flash memory management basis by sequentially reading and grouping fragments on a memory block by memory block basis, regardless of the arrangement order of the fragments being grouped. Once this reading and grouping sequence yields a full memory block, the full memory block may be written to an existing free block in the flash memory 1210, and at least one new block may be formed. As noted above, flash defragmentation consistent with an embodiment of the inventive concept will be performed according to a flash memory management unit, such as a page, a super page, a block, a super block, a group of pages, a group of blocks, etc.

Referring to FIG. 10, it is assumed that the fragments associated with files A, B, and C described in the context of FIG. 7 are initially stored, as illustrated, in the logical space of the flash memory 1210. That is, fragments a1, a2 and b4 are stored in logical block 0000, fragments c1 and b1 are stored in logical block 0001, and fragments b2, c2 and b3 are stored in logical block 0002. Thus logical blocks 0000, 0001 and 0002 are each considered a "fragmented block" because it has been invalidated as a block, or stores at least one fragment while remaining not full. In the illustrated example of FIG. 10 it is assumed that fragments are stored by the host 1100 on a page basis. Thus, in the illustrated example each not-invalidated fragmented block will include at least one valid written page, but less than four valid written pages. Since no fragment (not one valid page) is stored in logical block 0003, it is a free block.

When the flash defragmentation operation begins, the host 1100 reads four pages worth of fragments a1, a2, b4 and c1 beginning with a lowest numbered page of logical block 0000 until a fourth page of data is read. More generically, the defragmentation read operation begins by sequentially reading valid data at a defined start address, on a page by page basis, until N pages of data have been read, wherein each block of flash memory (or each flash memory management unit) is defined as comprising N pages. Thus, as one of ordinary skill in the art may understand from the illustrated example of FIG. 10 that the foregoing "read and group" process may continue until any reasonable number of fragments are collected into one or more non-fragmented blocks.

The foregoing fragments a1, a2, b4, and c1 are read and stored to host memory 1124 in the embodiment of FIG. 10. It should be noted, however, that host memory 1124 is only one example of a grouping memory that may be used to group the read fragments. The term "grouping memory" as used herein means any memory used to store (and thereby group) fragments during a flash defragmentation operation. In essence, one flash memory management unit's worth of fragments are read and then stored in the grouping memory.

Since one block of data is assumed as the flash memory management unit in the working example, once a full block of data (e.g., fragments a1, a2, b4 and c1) is stored in the host memory 1124, a write command is issued by the host 1100 and the collection of fragments a1, a2, b4 and c1 is written from the host memory 1124 to the free block 0003 of the flash memory 1210.

Following these data consolidating read and write operations and recognizing that the flash memory 1210 has no free block, the corresponding logical block 0000 may be erased to create a new free block. In this context, a "free block" is an empty block existing before the defragmentation operation begins, while a "new free block" is an empty block existing as the result of the defragmentation operation. For example, the host 1100 may use a data invalidity, a trim, or similar command to erase the logical block 0000 once the grouped fragments stored in the host memory 1124 have been successfully written to logical block 0003. A corresponding erase operation is performed on the physical space (not illustrated) of the flash memory 1210, and the logical block 0000 is effectively converted into a free block in an updated block mapping table, for example. Exemplary data invalidity and trim commands are described, for example, in pending U.S. patent application Ser. No. 12/775,767 filed May 7, 2010.

Thereafter, it is assumed that the flash defragmentation operation continues in similar manner by reading and grouping fragments b1, b2, c2 and b3. That is, the host 1100 sequentially reads fragments b1, b2, c2 and b3 from logical blocks 0001 and 0002 and stores the resulting data in the host memory 1124. Here again, fragments b1, b2, c2 and b3 fit into one block unit. Using a subsequent write command, the host 1100 writes the consolidated data associated with the fragments b1, b2, c2 and b3 and stored in the host memory 1124 to the new free block 0000. Using an additional trim command, the host device 1100 effectively erases both logical blocks 0001 and 0002. That is, corresponding erase operations directed to the physical memory space associated with logical blocks 0001 and 0002 may subsequently be executed (e.g.) during memory system idle time.

Figure 11:
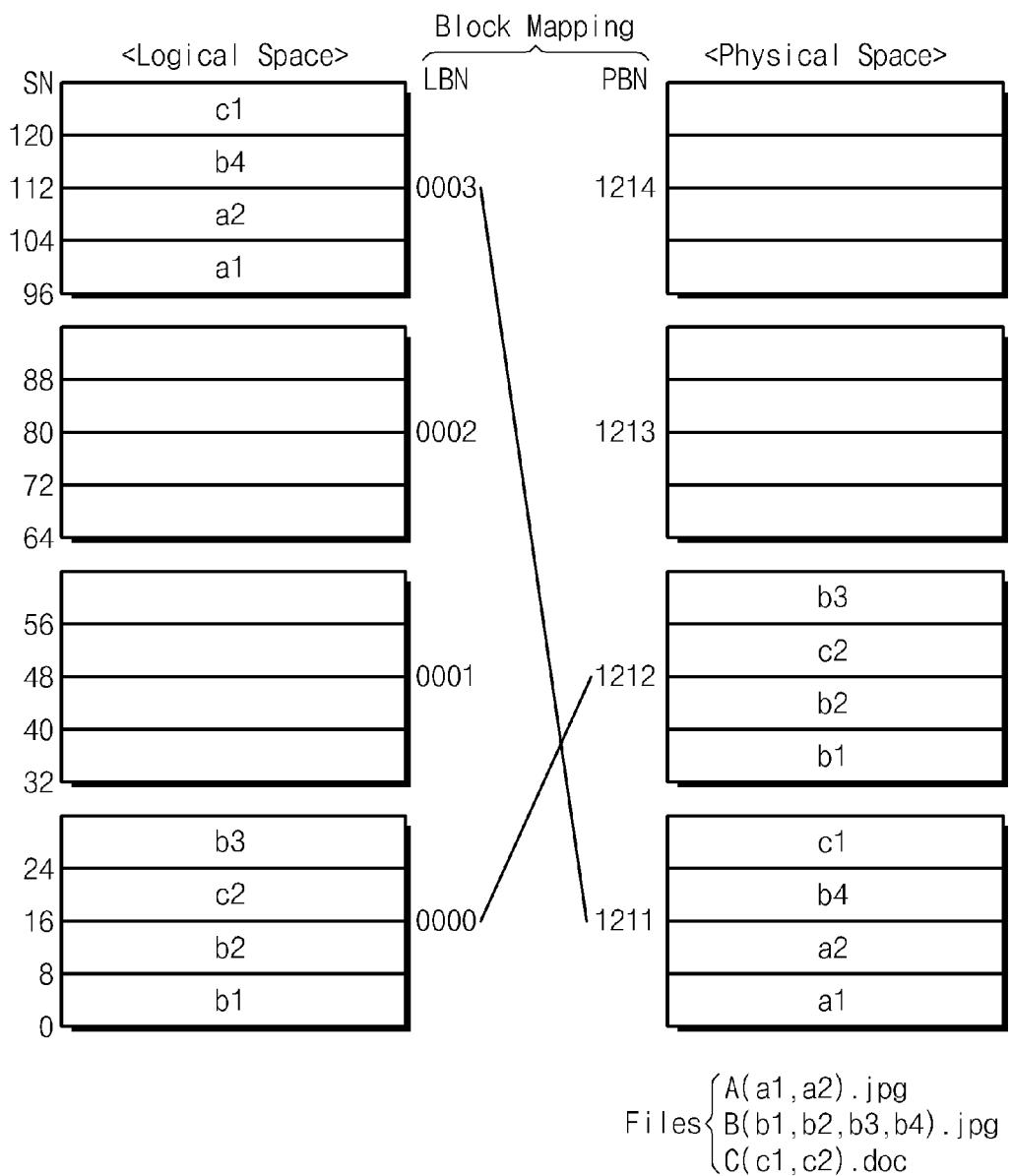
FIGS. 11 and 12 are diagrams illustrating the results of flash defragmentation of FIG. 10.
Figure 12:
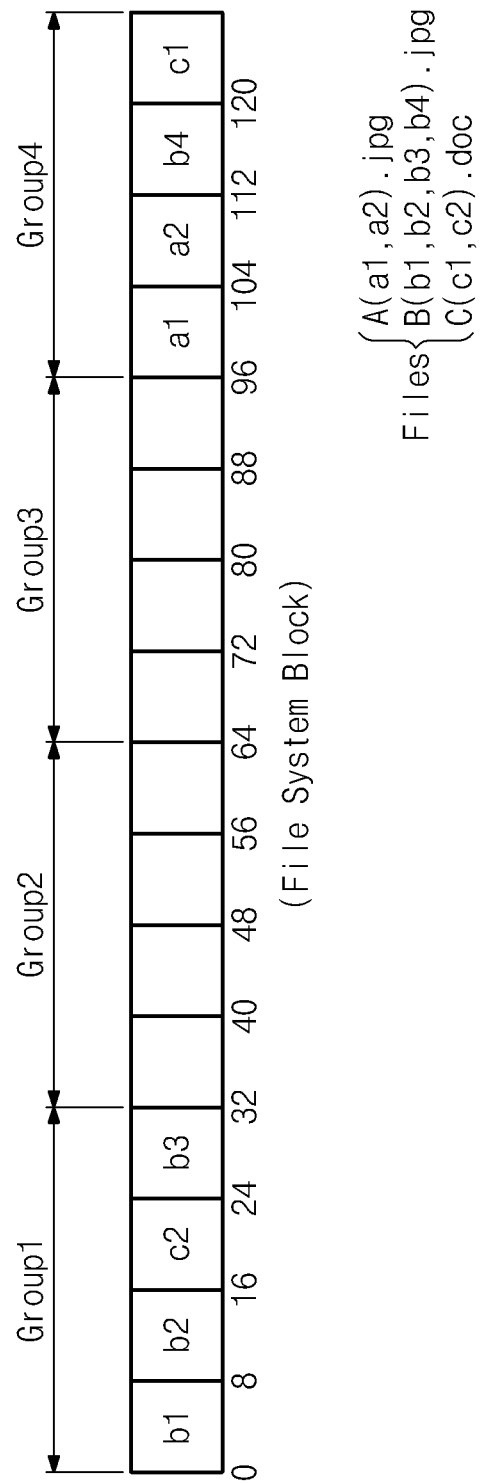

FIGS. 11 and 12 collectively illustrate the results of the flash defragmentation operation described above in relation to FIG. 10. FIGS. 11 and 12 respectively illustrate the flash defragmentation results from the viewpoint of the flash memory 1210 and the file system 1122. Referring to FIG. 11, fragments b1, b2, c2 and b3 are stored in relation to the logical block 0000 in logical space while being mapped to physical block 1212 in physical space. Fragments a1, a2, b4 and c1 are stored in relation to logical block 0003 in logical space while being mapped to physical block 1211 in physical space. Referring to FIG. 12, fragments b1, b2, c2 and b3 are stored in a first file system block group (Group1) including sector numbers 0~31, and fragments a1, a2, b4 and c1 are stored within a fourth file system block group (Group4) including sector numbers 96~127.

Figure 13:
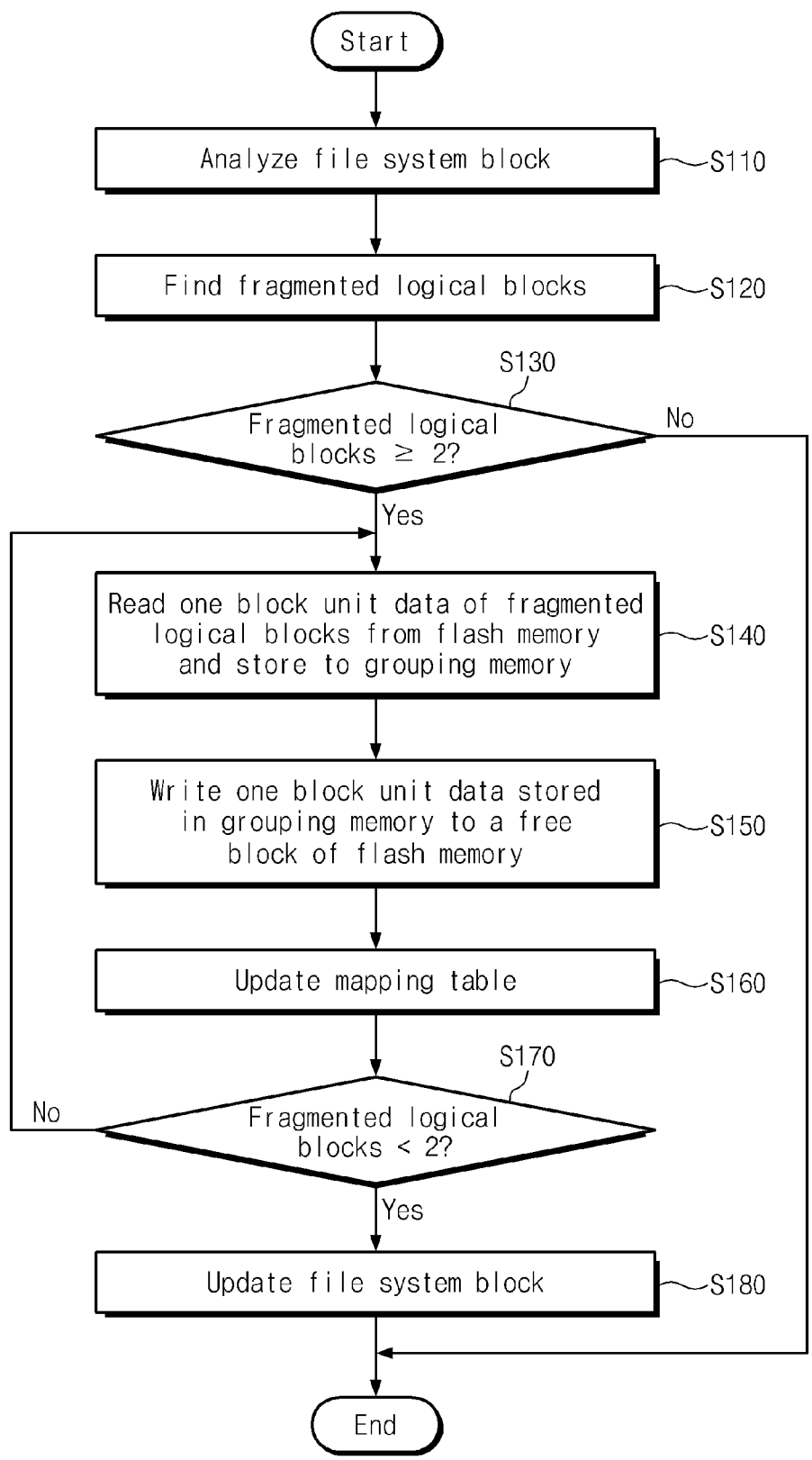
FIG. 13 is a flow chart illustrating a flash defragmentation method of FIG. 10.

FIG. 13 is a flow chart summarizing a host-based flash defragmentation method consistent with the example described in relation to FIG. 10. When flash defragmentation starts, the host 1100 must detect information defining a flash memory management unit (e.g., a memory block).

The host 1100 analyzes file system blocks and groups within the file system blocks according to the identified memory block basis (S110), and identifies corresponding fragmented blocks (S120).

If the number of fragmented logical blocks is less than a defined minimum, or a defined "fragmented block threshold", assumed to be two in the illustrated example (S130=No), then the flash defragmentation operation ends. However, if the number of fragmented logical blocks is greater than or equal to the fragmented block threshold (S130=Yes), one block unit of data (e.g., fragments a1, a2, b4 and c1) is read from one or more fragmented blocks (e.g., logical block 0000 and 0001) and stored in the host memory 1124 (S140). The host 1100 then writes the data stored in the host memory 1124 to a free block in the flash memory 1210 (S150). Thereafter, the FTL 1232 updates a corresponding mapping table (S160) to reflect the changes.

If the number of fragmented logical blocks is now less than the fragmented block threshold (S170=Yes), the file system blocks are updated to reflect the flash defragmentation results (S180) and the flash defragmentation operation ends. If, however, the number of fragmented logical blocks remains greater than or equal to the fragmented block threshold (S170=No), the defragmentation operation contuse by returning to step S140. In the working example, flash defragmentation operation continues by reading and grouping fragments b1, b2, c2 and b3 stored in the fragmented blocks 0001 and 0002.

According to the host-based (or external) flash defragmentation method of FIG. 13, flash defragmentation may be performed on fragments on a memory block basis using a series of read/write commands generated by the host 1100. The use of a flash defragmentation method according to certain embodiments of the inventive concept makes it possible to reduce the number of data transfer operations required to implement the defragmentation operation while efficiently providing more available free space in the flash memory.

Figure 14:
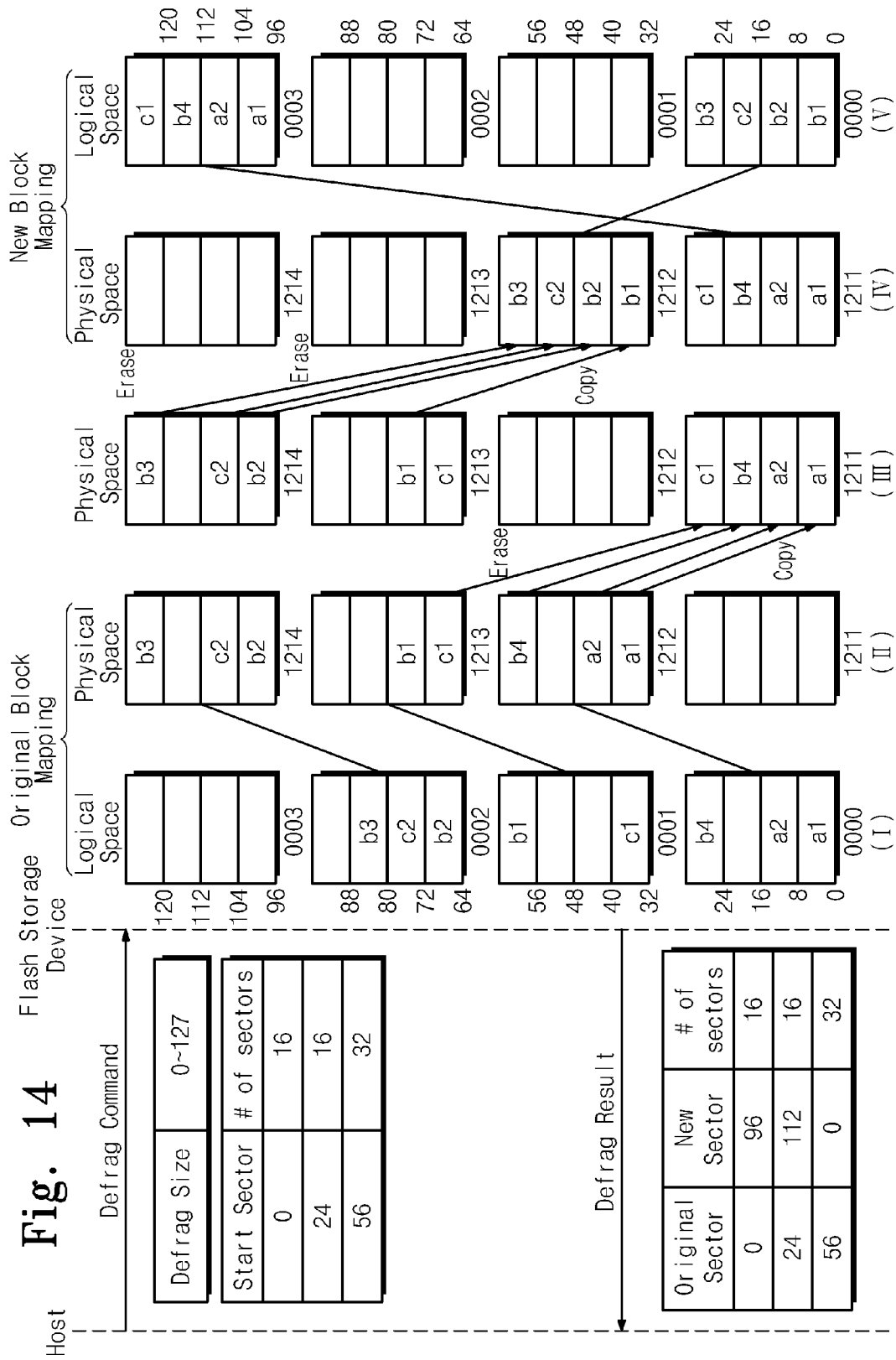
FIG. 14 is a diagram illustrating flash defragmentation by a flash storage device.

FIG. 14 is a diagram illustrating an internal flash defragmentation operation performed within the flash storage device 1200. The host 1100 may provide a flash defragmentation command (hereafter, a "defrag command") to the flash storage device 1200 to begin the internal flash defragmentation operation. As part of the defrag command, or conjunction therewith. the host 1100 may provide (e.g.,) a defrag block size, a defrag start sector, a number of sectors (# of sectors), and/or a bitmap for a sector of the corresponding region storing valid data. The example of FIG. 14 shows only a selected few of these defrag command related data components, and it should be noted that many different types of defrag commands are contemplated for use within various embodiments of the inventive concept.

Upon receiving a defrag command, the flash storage device 1200 may perform the internal flash defragmentation operation to completion without further exchange of data (e.g., the series of host generated read/write operation noted above) with the host 1100. After completion of the internal defragmentation operation, the flash storage device may provide results to the host 1100 in the form of updated mapping tables, etc. For example, the defrag results may correlate original sector number(s) with new sector number(s), a final number of valid sectors, etc. The host 1100 may then update the file system blocks on the basis of the defrag results.

Referring to FIG. 14, the flash storage device 1200 identifies a logical block within the flash memory 1210 according to a given defrag start sector, as well as a number of sectors to be defragmented, and collects state information related to the corresponding physical space in the flash memory 1210 using, for example a mapping table. The flash storage device 1200 may then use the physical space state information to identify fragmented blocks, free blocks, and/or full blocks. In this context, the definition of a fragmented block may be variously defined by memory system designers, or in the context of certain applications running in the host 1100. As used above, the term "fragmented block" meant any block between a free block and a full block, but this need not be the case. Certain minimum and maximum limits may be used to identify fragmented blocks within a particular defragmentation operation. Once identified, the flash storage device 1200 may construct a list of fragmented blocks, and may also construct validity information for each page within each fragmented block using, for example, bitmap(s) or look-up table(s).

Similar to the working examples described in relation to FIGS. 7 and 10, the following example assumes that three files; A (including a1, a2), B (including b1, b2, b3, b4), and C (including c1, c2), are stored in the logical space of the flash memory 1210. Fragments a1, a2 and b4 are stored in logical block 0000, fragments c1 and b1 are stored in logical block 0001, and fragments b2, c2 and b3 are stored in logical block 0002. Logical block 0003 is a free block. As illustrated in an original block mapping table of FIG. 15, the logical block 0000 is mapped to physical block 1212, the logical block 0001 is mapped to physical block 1213, and logical block 0002 is mapped to physical block 1214.

Referring back to FIG. 14, the flash defragmentation operation is performed on a memory block basis in the physical space of the flash memory 1210. For example, fragments a1, a2 and b4 stored in the physical block 1212 and fragment c1 stored in the physical block 1213 are copied to the free block 1211. Then, the physical block 1212 is erased to become a new free block. Thereafter, fragment b1 stored in the physical block 1213 and fragments b2, c2 and b3 stored in the physical block 1214 are copied to new free block 1212. Then, physical blocks 1213 and 1214 may be erased to become additional new free blocks. Herein, each copy operation may be performed using a conventionally understood, copyback programming operation executed within the flash memory 1210.

The corresponding page numbers for fragments a1, a2 and b4 may be maintained while one block unit data (e.g., the block unit including fragments a1, a2, b4 and c1) is being copied to the free block 1211. In this case, data may be copied to the free block 1211 in a sequential order for fragments a1, a2, c1 and b4. Likewise, data may be copied to the new free block 1212 in the sequential order of fragments b2, c3, b1 and b3.

As illustrated in a new block mapping table of FIG. 15, logical block 0000 remains mapped to physical block 1212 while logical block 0003 is now mapped to physical block 1211. Logical blocks 0001 and 0002 are mapped as free blocks. Referring to FIG. 14, the flash storage device 1200 performs flash defragmentation and provides the flash defragmentation results to the host 1100. The flash defragmentation results include an original sector number, a new sector number, and the number of sectors (# of sectors).

The flash defragmentation results may further include updated mapping information such as changed page numbers. However, in certain embodiment where only block mapping is used, a constituent FTL may not be able to provide updated page mapping. Therefore, in such circumstances when the page order changes from a1, a2, c1 and b4 or b2, c3, b1 and b3, the flash storage device 1200 must provide updated mapping information related to changed pages to the host 1100 through means outside the FTL. Those skilled in the art will recognize that any number of conventionally understood techniques may be used to communicate this information between the flash storage device 1200 and the host 110. Upon receipt of such information, the host 1100 may update the file system blocks accordingly using the file system 1122.

Figure 16:
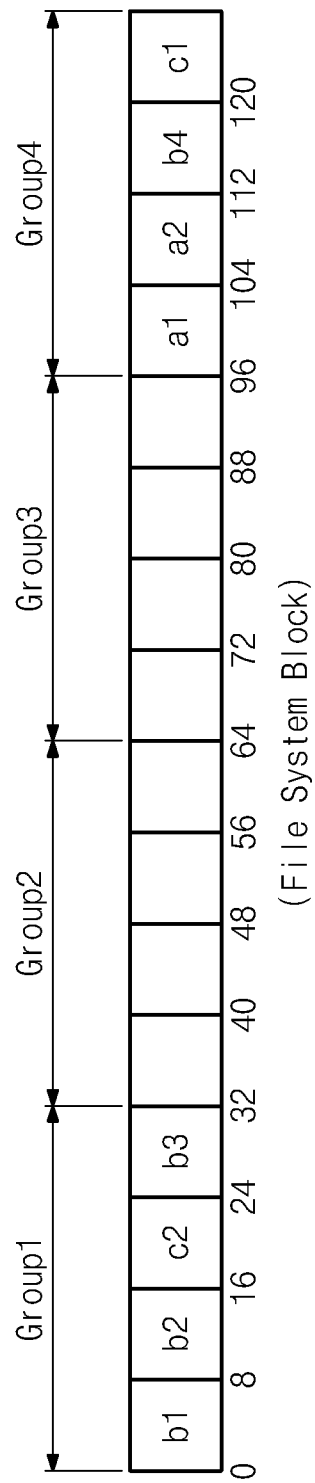

FIG. 16 illustrates a file system block structure reflecting the flash defragmentation results above. Referring to FIG. 16, fragments b1, b2, c2 and b3 are stored in a first file system block group (Group1) including (or indicated by) the sector numbers 0~31. Fragments a1, a2, b4 and c1 are stored in a fourth file system block group (Group4) indicated by the sector numbers 96~127.

Figure 17:
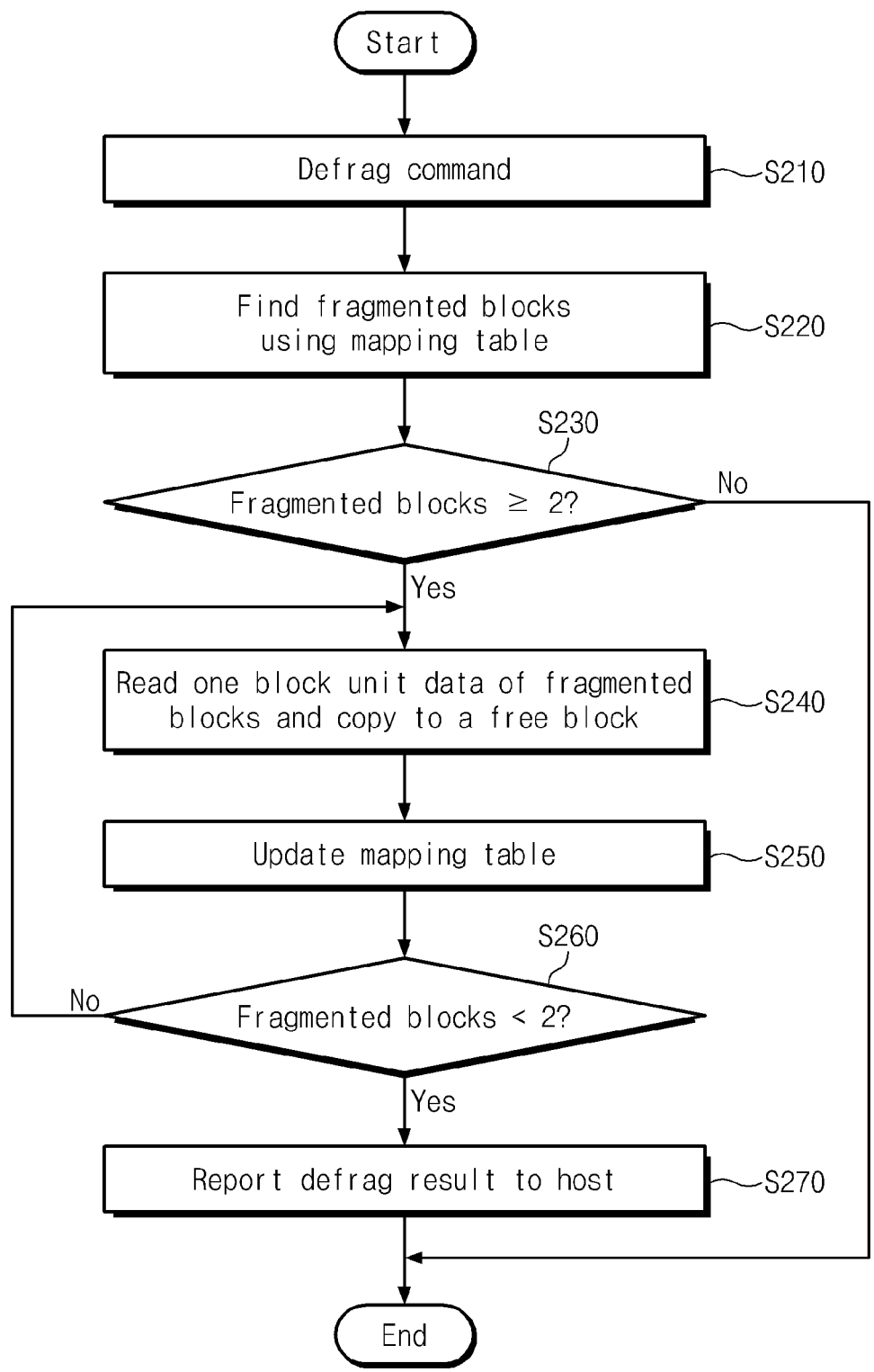
FIG. 17 is a flow chart illustrating a flash defragmentation method of FIG. 14.

FIG. 17 is a flow chart summarizing the internal flash defragmentation method of FIG. 14. When receiving a defrag command from a user, the host 1100 determines information defining the flash memory management unit (e.g., one memory block). The host 1100 analyzes file system blocks and groups the file system blocks on a memory block basis (S210). The host 1100 then provides a defrag command to the flash storage device 1200. The host 1100 may provide information about a start sector and the number of sectors, together with the defrag command. The flash storage device 1200 uses a mapping table to find fragmented blocks (S220).

If the number of fragmented blocks is less than a fragmented block threshold (e.g., two) (S230=No), the flash defragmentation operation ends. However, if the number of fragmented blocks is greater than or equal to the fragmented block threshold (S230=Yes), one block unit of data (e.g., including fragments a1, a2, b4 and c1) is read from the flash memory 1210 and copied to a free block (e.g., 1211 in the example of FIG. 14) of the flash memory 1210 (S240). The flash storage device 1200 then erases the physical block 1212, whose page data are all invalidated, to create a new free block. Thereafter, the FTL 1232 updates a corresponding mapping table (S250).

If the number of fragmented blocks now falls below the fragmented block threshold (S260=Yes), the flash defragmentation operation results are provided to the host 1100 and the flash defragmentation operation ends. However, if the number of fragmented blocks remains greater than or equal to the fragmented block threshold (S260=No), the flash defragmentation operation continues by returning to step S240. In the above example, the flash defragmentation concludes by read-grouping another block unit of data including fragments b1, b2, c2 and b3 from the fragmented blocks.

According to the internal flash defragmentation method of FIG. 17, the flash defragmentation operation is again performed for fragments on a memory block basis in response to a defrag command received from the host 1100. However, the host 1100 need not be actively involved (e.g., issue enabling read/write commands) during the re-grouping by copying of fragments into various blocks. That is, the use of a flash defragmentation operation according to the embodiment of the inventive concept makes it possible to perform the flash defragmentation without multiple read/write data transfers between the host 1100 and the flash storage device 1200. This reduction of data transfers during the flash defragmentation operation speeds up the operation while making efficient use the available free space in the flash memory.

Heretofore, the flash storage device 1200 has been assumed to be a replacement within a constituent host system for a conventional memory system including a hard disk (e.g., a hard disk drive, HDD). Thus, legacy file systems and applications running on the host 1100 may continue to run on hardware platforms that replace conventional HDDs with solid state drives (SDDs) or similar memory systems operating in accordance with embodiments of the inventive concept. However, this either/or approach to the provision of a bulk data storage medium need not always be the case.

Figure 18:
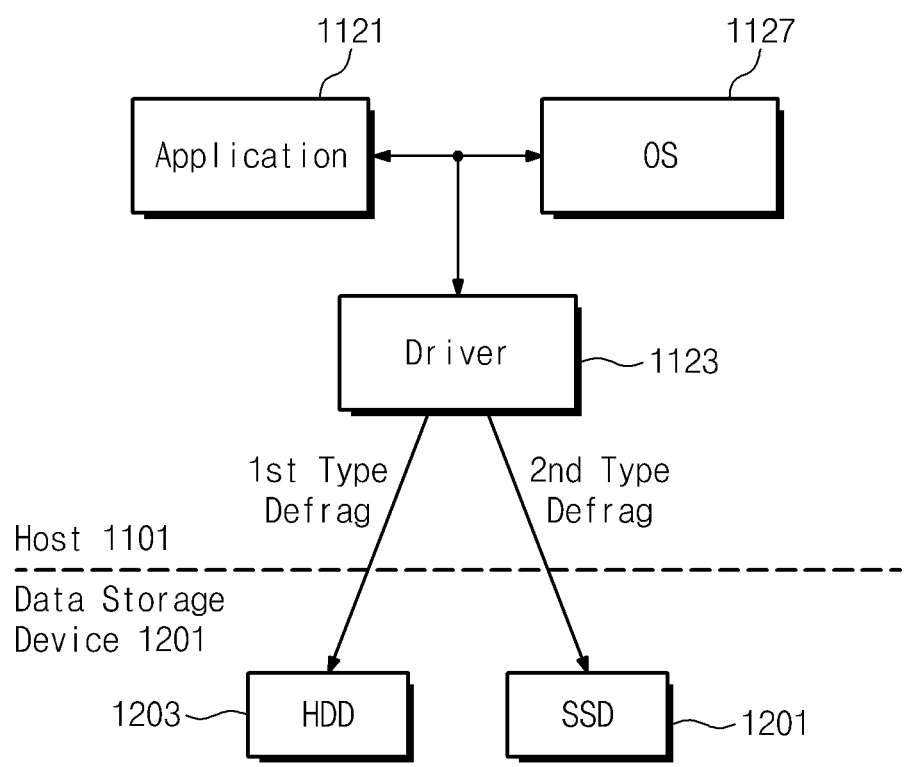
FIG. 18 illustrates an example of a host system incorporating both an SSD and HDD and capable of running competent defragmentation operations for each.

For example, the embodiment of the inventive concept illustrated in FIG. 18 comprises a host 1101 and a data storage device 1201. As before, the host 1101 comprises an application 1121 running on a computational platform (not shown) in conjunction with an operating system (OS) 1127. This combination of software functionality cooperates to control one or more device drivers 1123 (wherein the device drivers may be integrally incorporated within the OS 1127). However, instead of generating either a HDD compatible defragmentation operation or a SDD compatible defragmentation operation, the host 1101 is configured to generate both a first type defragmentation operation used by the HDD 1203 and a second type defragmentation operation used by the SSD, or some other flash storage device consistent with embodiments of the inventive concept.

Thus, certain hybrid host systems including both a flash storage device and a HDD may be effective defragmented. The first type defragmentation operation may be conventional in nature, and the second type defragmentation operation may be as described above.

It will be apparent that the flash memory system 1000 according to certain embodiments of the inventive concept may be incorporated into a variety of product configurations. Ready examples of host systems incorporating embodiments of the inventive concept include computers, digital cameras, portable phones, MP3 players, PMPs, game devices, etc. The flash storage device 1200 may take the form of a flash memory-based solid state drives (SSDs), flash memory cards, flash memory modules, etc. The host 1100 and the flash storage device 1200 may be connected through one or more standardized interfaces such as ATA, SATA, PATA, USB, SCSI, ESDI, PCI Express, or IDE interfaces, and may be operated using one or more conventionally understood data communication protocols.

Figure 19:
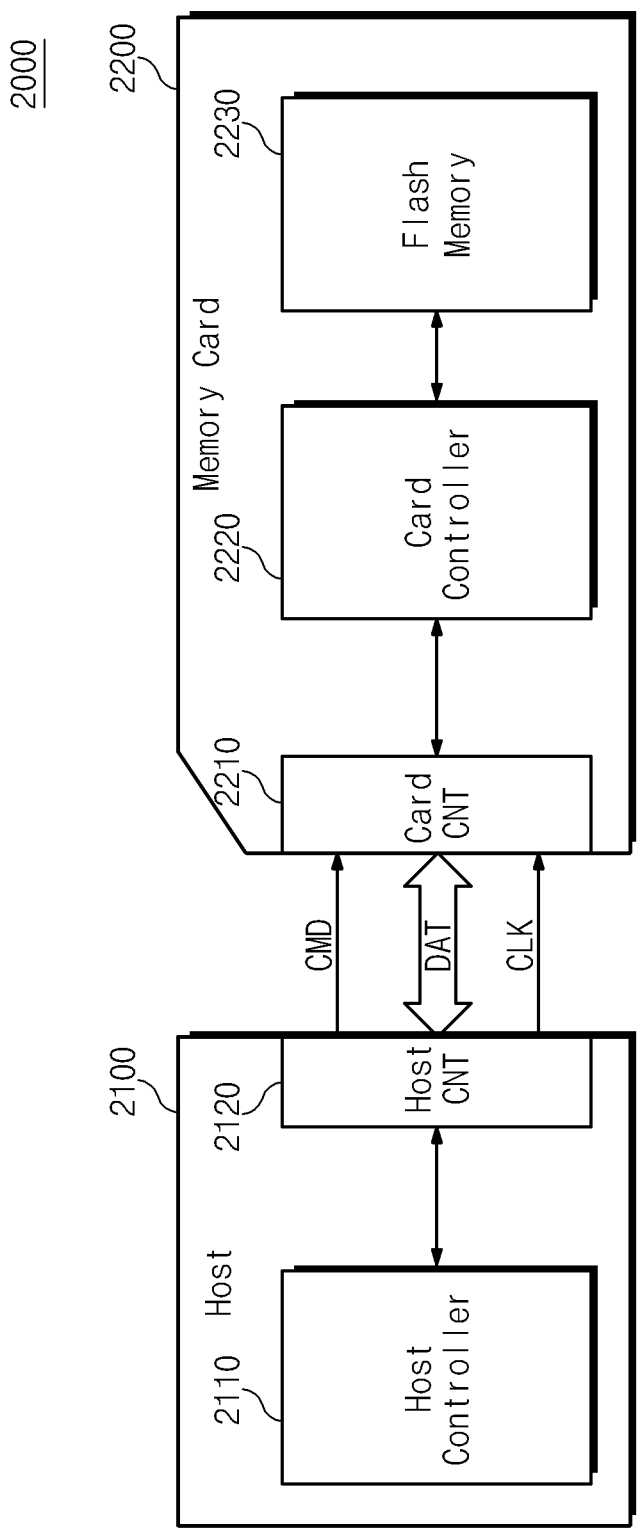
FIG. 19 illustrates an example of applying flash defragmentation to a memory card according to an exemplary embodiment of the inventive concept.

FIG. 19 illustrates one possible application (a memory card) incorporating a flash defragmentation system and/or method according to an embodiment of the inventive concept. Referring to FIG. 19, a memory card system 2000 includes a host 2100 and a memory card 2200. The host 2100 includes a host controller 2110 and a host connection unit 2120. The memory card 2200 includes a card connection unit 2210, a card controller 2220, and a flash memory 2230.

The host connection unit 2120 and the card connection unit 2210 include a plurality of pins. The pins include command pin(s) (CMD), a data pin(s) (DAT), clock pin(s) (CLK), and/or related power pins (not shown). The number of pins varies according to the type of the memory card 2200. For example, certain contemporary examples of an SD card includes nine (9) pins.

The host 2100 writes/reads data in/from the memory card 2200. The host controller 2110 transmits a command (e.g., a write command), a clock signal CLK generated by an internal clock generator (not illustrated) of the host 2100, and data (DATA) trough the host connection unit 2120 to the memory card 2200.

The card controller 2220 stores data in the flash memory 2230, in synchronization with a clock signal generated by an internal clock generator (not illustrated) of the card controller 2200, in response to a write command received through the card connection unit 2210. The flash memory 2230 stores data received from the host 2100. For example, if the host 2100 is a digital camera, the flash memory 2230 stores video data.

In FIG. 19, the host controller 2110 may include a file system and an application supporting flash defragmentation. The card controller 2220 may use the FTL to perform flash defragmentation in the memory card 2200. The memory card system of FIG. 19 may support both of the host-based flash defragmentation and the memory card-based flash defragmentation.

Figure 20:
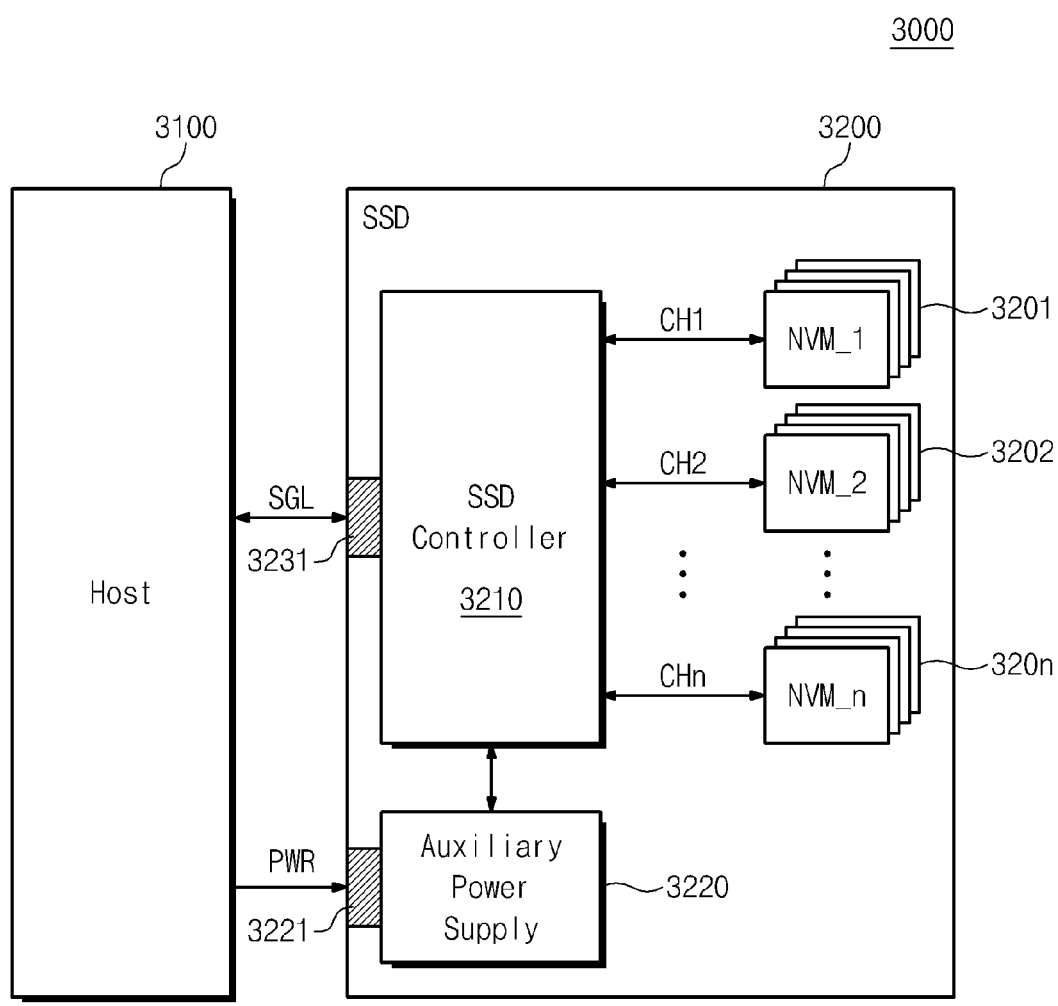
FIG. 20 is a block diagram illustrating an example of implementing flash defragmentation in a solid state drive (SSD) according to an exemplary embodiment of the inventive concept.

FIG. 20 illustrates another possible application (a solid state drive or SSD) incorporating a flash defragmentation system and/or method according to an embodiment of the inventive concept. Referring to FIG. 20, an SSD system 3000 includes a host 3100 and an SSD 3200. The SSD 3200 communicates signals (SGL) with the host 3100 through a signal connector 3231, and receives power through a power connector 3221. The SSD 3200 includes a plurality of nonvolatile memory devices 3201~320n (or NVM_1 through NVM_n), an SSD controller 3210, and an auxiliary power supply unit 3220.

The nonvolatile memory devices NVM_1 through NVM_n are used as data storage media within the SSD 3200. The nonvolatile memory devices NVM_1 through NVM_n may be implemented using flash memory devices with high storage capacity. That is, in certain contemporary example, the SSD 3200 may be primarily implemented using flash memory devices.

The nonvolatile memory devices NVM_1 through NVM_n may be connected to the SSD controller 3210 via a plurality of channels CH1~CHn. One or more memory devices may be connected to one channel. The memory devices connected to one channel may be connected to the same data bus. In this case, flash defragmentation may be performed on the basis of a super block connecting a plurality of memory blocks, or on the basis of a super page connecting a plurality of pages.

The SSD controller 3210 may communicate signals SGL with the host 3100 through the signal connector 3231. Herein, the signals SGL include a command, an address, and data. The SSD controller 3210 writes/reads data in/from the corresponding memory device according to a command of the host 3100. The internal structure of the SSD controller 3210 will be described later in detail with reference to FIG. 21.

The auxiliary power supply unit 3220 is connected through the power connector 3221 to the host 3100. The auxiliary power supply unit 3220 may receive power PWR from the host 3100 to perform a charge operation. The auxiliary power supply unit 3220 may be located in or outside the SSD 3200. For example, the auxiliary power supply unit 3220 may be located at the main board to supply auxiliary power to the SSD 3200.

Figure 21:
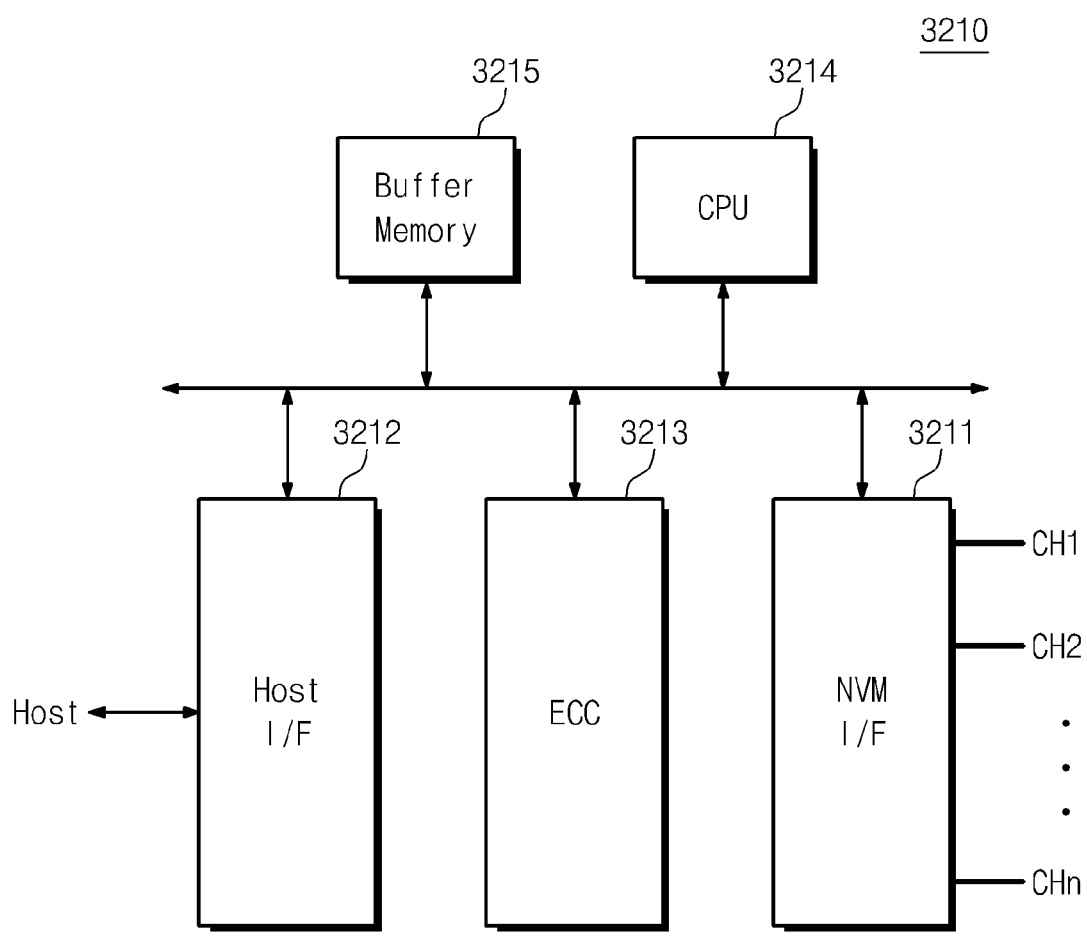
FIG. 21 is a block diagram illustrating an SSD controller of FIG. 19.

FIG. 21 is a block diagram further illustrating one possible example of the SSD controller 3210 of FIG. 19. Referring collectively to FIGS. 20 and 21, the SSD controller 3210 includes a nonvolatile memory (NVM) interface (I/F) 3211, a host interface 3212, an error correction code (ECC) 3213, a central processing unit (CPU) 3214, and a buffer memory 3215.

The NVN interface 3211 scatters the data, received from the buffer memory 3215, to the respective channel CH1~CHn. The NVM interface 3211 transfers the data read from the nonvolatile memory devices NVM_1 through NVM_n to the buffer memory 3215. Herein, the NVM interface 3211 may use an interface protocol compatible with NAND flash memory. That is, the SSD controller 3210 may perform program/read/erase operations according to an interface protocol controlling data transfer to/from a NAND flash memory.

With continued reference to FIGS. 20 and 21, the host interface 3212 provides an interface with the SSD 3200 according to one or more protocol(s) compatible with the associated host 3100. The host interface 3212 may communicate with the host 3100 via a Universal Serial Bus (USB), a Small Computer System Interface (SCSI), PCI Express, ATA, PATA (Parallel ATA), SATA (Serial ATA), or SAS (Serial Attached SCSI). Also, the host interface 3212 may perform a disk emulation function to emulate the operation of a legacy, hard disk (HDD) functionality supported by the host. In other words, operation of the host interface 3212 allows the host 3100 to functionally "see" a legacy HDD peripheral when the SSD 3200 is operatively connected.

The CPU 3214 analyzes/processes signal(s) SGL received from the host 3100. The CPU 3214 controls the host 3100 or the nonvolatile memory devices NVM_1 through NVM_n through the host interface 3212, or the NVM interface 3211. The CPU 3214 may further control the operations of the nonvolatile memory devices NVM_1 through NVM_n according to firmware driving the SSD 3200.

The buffer memory 3215 temporarily stores data write data received from the host 3100, or data read from the nonvolatile memory device. Also, the buffer memory 3215 may store cache data or metadata to be stored in the nonvolatile memory devices NVM_1 through NVM_n. In a sudden power-off operation, cache data or metadata stored in the buffer memory 3215 are stored in the nonvolatile memory devices NVM_1 through NVM_n. The buffer memory 3215 may be implemented using DRAM and/or SRAM devices.

The SSD system 3000 of FIGS. 20 and 21 may support both the flash defragmentation by the host 3100 and the flash defragmentation by the SSD 3200, as described above.

Figure 22:
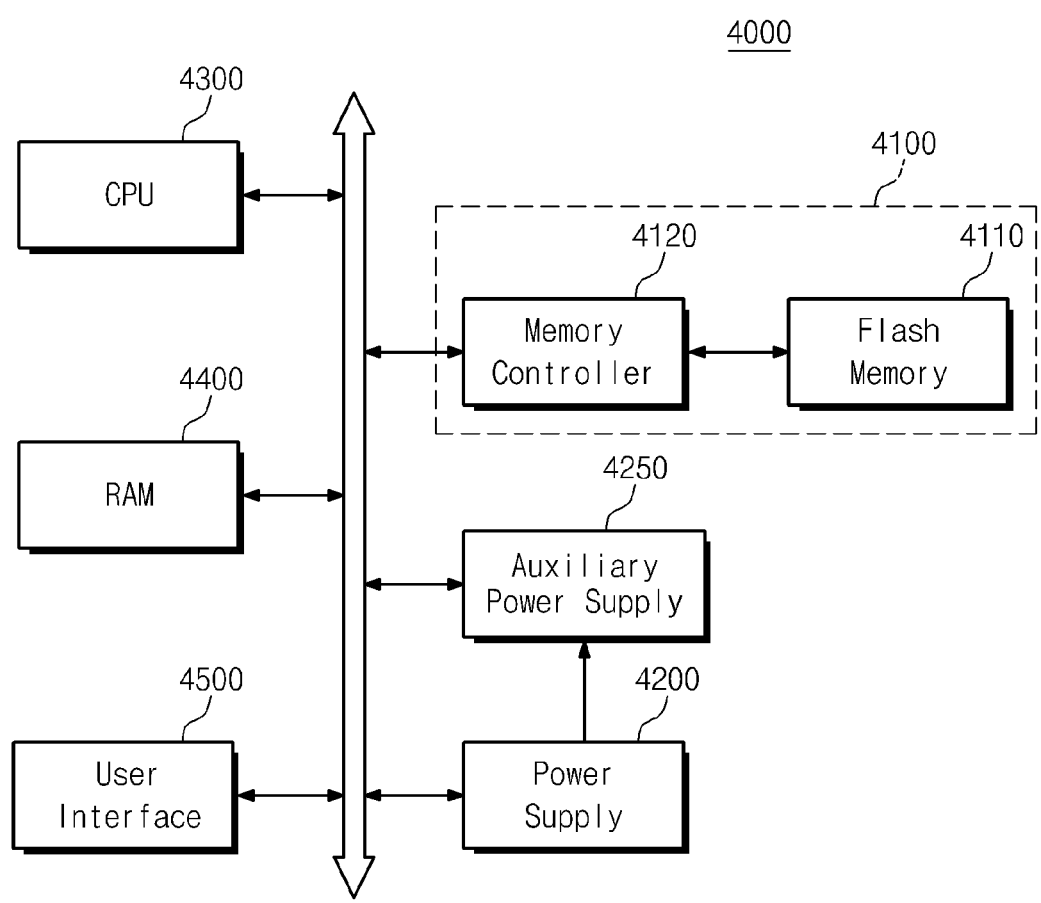
FIG. 22 is a block diagram illustrating an example of implementing flash defragmentation in a flash memory module according to an exemplary embodiment of the inventive concept.

FIG. 22 is a block diagram illustrating yet another possible application, i.e., a digital device, capable on incorporating a flash defragmentation system and method according to an embodiment of the inventive concept. That is, the digital device comprises a flash memory module 4000, and may take the form of a personal computer (PC), a notebook computer, a portable phone, a PDA (Personal Digital Assistant), a digital camera, etc.

Referring to FIG. 22 the flash memory module 4000 generally comprises a memory system 4100, a power supply unit 4200, an auxiliary power supply unit 4250, a central processing unit (CPU) 4300, a random access memory (RAM) 4400, and a user interface 4500. The memory system 4100 of FIG. 22 may be implemented using a memory controller 4120 (such as the control unit 1230 of FIG. 2), and a flash memory 4110 (such as flash memory 1210 of FIG. 2). In this manner, the memory system 4100 may perform flash defragmentation by an associated host and/or flash defragmentation by the flash memory module 4000.

As described above, certain embodiments of the inventive concept are configured to perform flash defragmentation on a flash memory management unit basis, thereby making it possible to reduce the number of data transfers associated with the defragmentation process, and yet efficiently making use of free space within a flash memory. Contemporary flash memory has been assumed in the foregoing examples for purposes of clarity. However, the inventive concept is not limited to only flash type memories, but may be readily adapted by those skilled in the art to other forms of nonvolatile memory.

The above-disclosed subject matter is to be considered illustrative and not restrictive, and the appended claims are intended to cover all such modifications, enhancements, and other embodiments, which fall within the scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A method of defragmenting a flash memory operated under the control of a host, the flash memory being arranged in a plurality of blocks including a free block and a plurality of fragmented blocks respectively storing at least one fragment, the method comprising:

identifying a plurality of fragments stored in the plurality of fragmented blocks according to corresponding logical addresses;

converting the logical addresses to corresponding physical addresses using a flash translation layer (FTL);

using the physical addresses, reading a subset of fragments in the plurality of fragments from at least one of the plurality of fragmented blocks;

grouping the subset of fragments in a defragmentation region having a size defined by a flash management unit in response to a defragmentation command by the host;

writing the grouped subset of fragments to the free block, wherein the reading and the grouping of the subset of fragments are performed regardless of an arrangement order of the plurality of fragments as stored in the flash memory; and setting the defragmentation region according to a defragmentation size, a defragmentation start sector and a number of sectors provided by the host.

2. The method of claim 1, wherein the flash management unit is equal in size to a single block in the plurality of blocks.

3. The method of claim 1, wherein the logical addresses are defined by sector addresses compatible with a data storage method used with a hard disk drive (HDD).

4. The method of claim 1, further comprising:
creating at least one new free block from at least one of the fragmented blocks following writing of the grouped subset of fragments to the free block.

5. The method of claim 4, wherein the converting of the logical addresses into the corresponding physical addresses using the FTL is performed with reference to a mapping table managed by the FTL, the method further comprising:
updating the mapping table following writing of the grouped subset of fragments to the free block; and
updating the mapping table following creation of the new free block.

6. The method of claim 5, wherein the host comprises an application and a file system, and the method further comprises:
by operation of the application and the file system, defining systems files in relation to the logical addresses, and
updating the file system following each updating of the mapping table.

7. The method of claim 6, further comprising:
by operation of the file system, identifying a number of fragmented blocks;
comparing the number of fragmented blocks to a fragmented block threshold; and
only if the number of fragmented blocks exceeds the fragmented block threshold, executing the method of defragmenting the flash memory.

8. The method of claim 7, further comprising after the updating the system files:
identifying an updated number of fragmented blocks;
comparing the updated number of fragmented blocks to the fragmented block threshold; and
if the updated number of fragmented blocks still exceeds the fragmented block threshold, continue execution of the method of defragmenting the flash memory, or if the updated number of fragmented blocks does not exceed the fragmented block threshold, ending the method of defragmenting the flash memory.

9. The method of claim 1, wherein the host further comprises a host memory used as the grouping memory.

10. A method of defragmenting a flash memory, the flash memory being arranged in a plurality of blocks including a free block and a plurality of fragmented blocks storing a plurality of fragments, and the method comprising:
- managing a mapping table correlating externally applied logical addresses with physical addresses for the flash memory using a flash translation layer (FTL);
- identifying the plurality of fragmented blocks and a plurality of fragments stored in the plurality of fragmented blocks;
- reading a subset of fragments in a defragmentation region among the plurality of fragments without regard to an arrangement order of the plurality of fragments as stored in the fragmented blocks in response to a defragmentation command by a host, and writing the subset of fragments in the free block; and
- setting the defragmentation region according to a defragmentation size, a defragmentation start sector and a number of sectors provided by the host.

11. The method of claim 10, further comprising:
- updating the mapping table following the writing of the subset of fragments in the free block.

12. The method of claim 10, further comprising:
- performing a data invalidity operation on one of the fragmented blocks from which at least one fragment was read during the flash defragmentation operation to thereby convert the one fragmented memory block to a new free block.

13. The method of claim 12, further comprising:
- updating the mapping table following the data invalidity operation.

14. The method of claim 10, wherein the logical addresses are defined by sector addresses compatible with a data storage method used with a hard disk drive (HDD).

15. The method of claim 10, wherein the identifying of the plurality of fragmented blocks and the plurality of fragments stored in the plurality of fragmented blocks is performed with reference to the mapping table.

* * * * *